United States Patent
Keller et al.

(10) Patent No.: US 9,575,754 B2
(45) Date of Patent: Feb. 21, 2017

(54) ZERO CYCLE MOVE

(75) Inventors: James B. Keller, Redwood City, CA (US); John H. Mylius, Gilroy, CA (US); Conrado Blasco-Allue, Sunnyvale, CA (US); Gerard R. Williams, III, Los Altos, CA (US); Suparn Vats, Fremont, CA (US)

(73) Assignee: Apple Inc., Cupertino, CA (US)

( * ) Notice: Subject to any disclaimer, the term of this patent is extended or adjusted under 35 U.S.C. 154(b) by 845 days.

(21) Appl. No.: 13/447,651

(22) Filed: Apr. 16, 2012

(65) Prior Publication Data

US 2013/0275720 A1    Oct. 17, 2013

(51) Int. Cl.
*G06F 15/00* (2006.01)
*G06F 9/30* (2006.01)
*G06F 9/40* (2006.01)
*G06F 9/38* (2006.01)

(52) U.S. Cl.
CPC ........... *G06F 9/30032* (2013.01); *G06F 9/384* (2013.01)

(58) Field of Classification Search
None
See application file for complete search history.

(56) References Cited

U.S. PATENT DOCUMENTS

| | | | |
|---|---|---|---|
| 6,256,721 B1 | 7/2001 | Witt | |
| 6,505,293 B1 | 1/2003 | Jourdan et al. | |
| 6,560,671 B1 | 5/2003 | Samra et al. | |
| 6,594,754 B1 | 7/2003 | Jourdan et al. | |
| 2005/0091475 A1* | 4/2005 | Sodani | G06F 9/30101 712/217 |
| 2005/0138338 A1* | 6/2005 | Sodani | G06F 9/3824 712/225 |
| 2012/0005459 A1 | 1/2012 | Fleischman et al. | |

OTHER PUBLICATIONS

Jourdan, et al., "A Novel Renaming Scheme to Exploit Value Temporal Locality through Physical Register Reuse and Unification", MICRO 31 Proceedings of the 31st annual ACM/IEEE International Symposium on Microarchitecture, Nov. 1, 1998, 10 pages, IEEE Computer Society Press, Los Alamitos, CA, USA.
Kanter, David, "Intel's Sandy Bridge Microarchitecture", Real World Technologies, Sep. 25, 2010, http://www.realworldtech.com/sandy-bridge/, 25 pages. [Retrieved May 14, 2015].

* cited by examiner

*Primary Examiner* — George Giroux
(74) *Attorney, Agent, or Firm* — Rory D. Rankin; Meyertons, Hood, Kivlin, Kowert & Goetzel, P.C.

(57) ABSTRACT

A system and method for reducing the latency of data move operations. A register rename unit within a processor determines whether a decoded move instruction is eligible for a zero cycle move operation. If so, control logic assigns a physical register identifier associated with a source operand of the move instruction to the destination operand of the move instruction. Additionally, the register rename unit marks the given move instruction to prevent it from proceeding in the processor pipeline. Further maintenance of the particular physical register identifier may be done by the register rename unit during commit of the given move instruction.

23 Claims, 12 Drawing Sheets

ZERO CYCLE MOVE

BACKGROUND OF THE INVENTION

Field of the Invention

This invention relates to microprocessors, and more particularly, to efficiently reducing the latency and power of data move operations.

Description of the Relevant Art

Microprocessors typically include overlapping pipeline stages and out-of-order execution of instructions. Additionally, microprocessors may support simultaneous multi-threading to increase throughput. These techniques take advantage of instruction level parallelism (ILP) in source code. During each clock cycle, a microprocessor ideally produces useful execution of a maximum number of N instructions per thread for each stage of a pipeline, wherein N is an integer greater than one. However, control dependencies and data dependencies reduce maximum throughput of the microprocessor to below N instructions per cycle.

Conditional control flow instructions perform a determination of which path to take in an instruction stream. Control dependencies caused by conditional control flow instructions serialize instructions at conditional forks and joins along the control flow graph of the source code. Speculative execution of instructions is used to perform parallel execution of instructions despite control dependencies in the source code.

A data dependency occurs when an operand of an instruction depends on a result of an older instruction in program order. Data dependencies may appear either between operands of subsequent instructions in a straight line code segment or between operands of instructions belonging to subsequent loop iterations. In straight line code, read after write (RAW), write after read (WAR) or write after write (WAW) dependencies may be encountered. Register renaming is used to allow parallel execution of instructions despite the WAR and WAW dependencies. However, the true dependency, or RAW dependency, is still intact. Therefore, architectural registers repeatedly used as a destination register and subsequently as a source register cause serialization of instruction execution for associated source code segments.

One example of a common RAW dependency with an architectural register is assigning a base pointer a value stored in a stack pointer at the beginning of subroutines. A related second example is assigning the stack pointer a value stored in the base pointer to deallocate variables at the end of subroutines. These assignments are performed with move operations. Subroutines reduce the cost of developing large, reliable programs. Subroutines are often collected into libraries and used for sharing software. Therefore, the move operations occur frequently during the execution of programs and include the RAW dependency.

In view of the above, efficient methods and mechanisms for efficiently reducing the latency of data move operations are desired.

SUMMARY OF EMBODIMENTS

Systems and methods for efficiently reducing the latency of data move operations. In one embodiment, a processor includes a register rename unit configured to receive decoded instructions and determine whether a decoded given instruction qualifies to be a zero cycle move operation. Examples of qualifiers may be the move operation is a register-to-register move operation and support exists for maintaining a duplicate count of mappings for a given physical register number. If the determination is true, the rename register unit may assign a physical register number associated with a source operand of the given instruction to the destination operand of the given instruction. Each architectural register associated with the source operand and the destination operand may now be mapped to a same physical register number. In addition, control logic within the register rename unit may mark the given move instruction to prevent it from proceeding in the processor pipeline. For example, the control logic may mark the given move instruction to indicate completion at the dispatch pipeline stage.

In addition, the register rename unit may cause the value of the physical register number used for both the source and the destination operands to be bypassed to one or more instructions that are both younger in-program-order than the given move instruction and have a data dependency on the given move instruction. Further maintenance of the particular physical register number may be done by the register rename unit during commit of the given move instruction.

These and other embodiments will be further appreciated upon reference to the following description and drawings.

Figure 1:
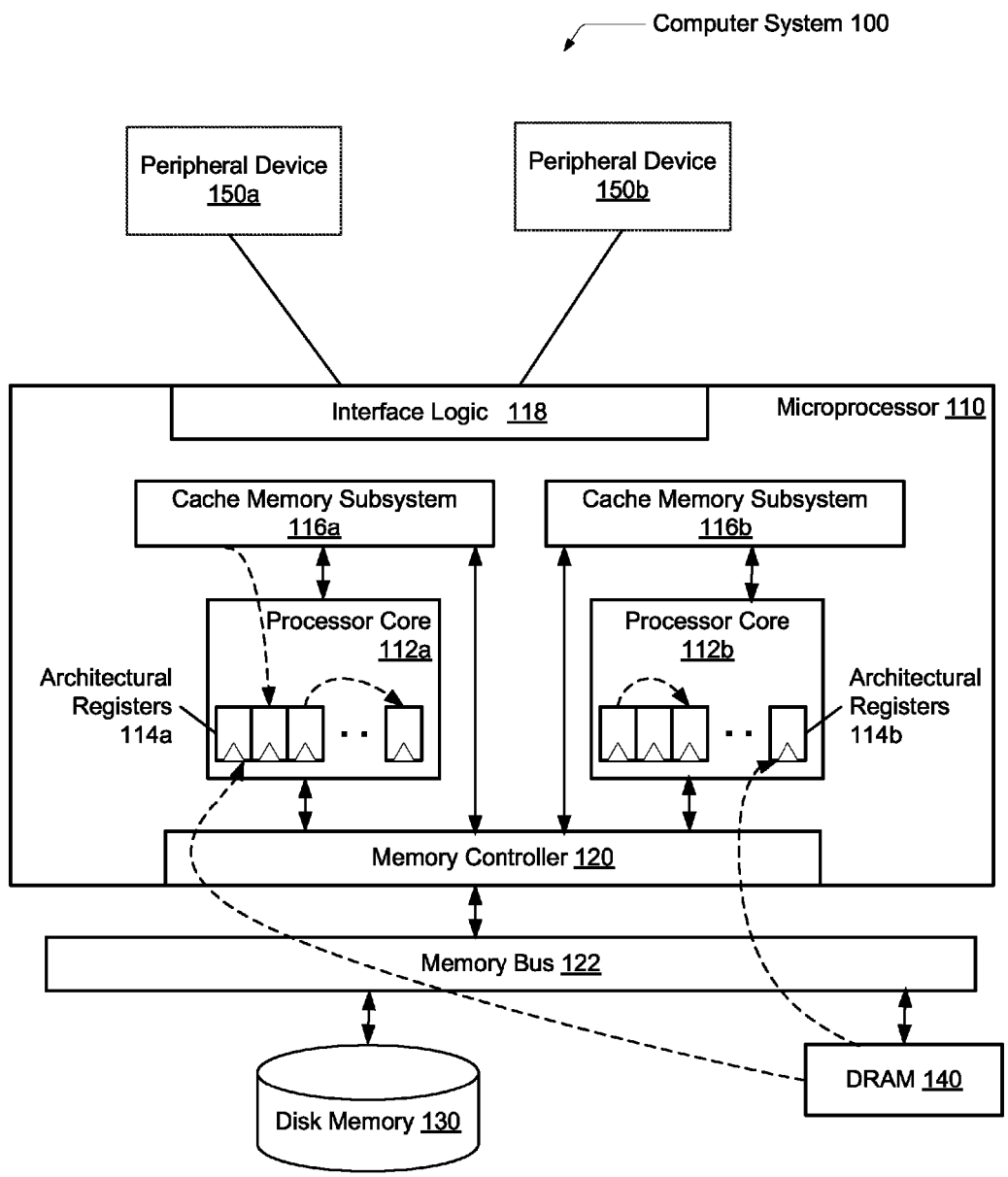
FIG. 1 is a generalized block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram of one embodiment of a computer system 100 is shown. As shown, microprocessor 110 may be connected to one or more peripheral devices 150a-150b, and external computer memory, such as disk memory 130 and dynamic random access memory (DRAM) 140. The disk memory 130 may store an operating system (OS) for the computer system 100. Instructions of a software application may be loaded into one or more of the cache memory subsystems 116a-116b within the microprocessor 110. The software application may have been stored in one or more of the disk memory 130, the DRAM 140 and one of the peripheral devices 150a-150b.

One or more of the processor cores 112a-112b may load the software application instructions from one of an associated cache memory subsystems 116a-116b and process the instructions. Generally speaking, when software programmers write applications to perform work according to an algorithm or a method, the programmers utilize variables to reference temporary and result data. This data utilizes space allocated in computer memory. The operating system allocates regions of memory for the software application.

During processing of the application, the data may be loaded from the allocated regions of memory into one or more of the cache memory subsystems 116a-116b. Subsequently, one or more of the architectural registers 114a-114b within the processor cores 112a-112b are used to load and store the temporary and result data. The architectural registers 114a-114b are architecturally visible registers that a software programmer and/or a compiler may identify within the software application. The architectural registers 114a-114b are associated with a given instruction set architecture (ISA). The hardware in the processor cores 112a-112b includes circuitry for processing instructions according to the given ISA. The hardware circuitry includes at least an associated set of architectural registers 114a-114b, functional units, pipeline staging elements and control logic. The ARM instruction set architecture may be selected for the given ISA. Alternatively, the Alpha, PowerPC, SPARC, MIPS, x86, or any other ISA may be selected.

The given ISA may be used to select a manner for declaring and allocating regions of memory. The given ISA may further determine a selected addressing mode used to transfer data between the microprocessor 110, including the architectural registers 114a-114b, and memory locations in one or more of the disk memory 130, the DRAM 140 and the peripheral devices 150a-150b. A load instruction is typically used to transfer data between memory and the microprocessor 110. A move instruction is used to transfer data between the architectural registers 114a within the processor core 112a. Similarly, a move instruction is used to transfer data between the architectural registers 114b within the processor core 112b.

The dashed lines shown in the computer system 100 indicate a few examples of the data transfers performed by move and load operations. A given ISA may have a number of different move instructions. Depending on whether the software application is in a 16-bit or 32-bit code segment and whether an override instruction prefix is used, a move operation may transfer 8-bits, 16-bits, 32-bits or 64-bits of data. A significant percentage of the assembly language instructions used to implement the software programmer's application may include these move operations.

The mnemonic mov for the move instruction is a slight misnomer. Generally, the mov instruction does copy data from one location to another. For example, the mov instruction creates a copy of the data content in a first location specified by a source operand and writes this data content to a second location specified by a destination operand. However, the first location specified by the source operand does not become empty or invalid. The data content originally stored in the second location specified by the destination operand is generally overwritten during the execution of the mov instruction. However, as described later, the data content originally stored in the second location specified by the destination operand may not be overwritten when the mov instruction is converted to a zero cycle move operation. Rather, the destination operand may be assigned a renamed register number (or any other suitable identifier) that is also used by the source operand. Further details are provided below.

In addition to out-of-order issue of instructions to execution units within a superscalar microarchitecture, each of the processor cores 112a-112b may perform register renaming to increase throughput. Each of the processor cores 112a-112b may include a set of physical registers larger than a set of integer and floating-point architecturally visible registers, such as sets 114a and 114b. Using hardware, each of the processor cores 112a-112b dynamically renames an architectural register identifier used for a source operand. Similarly, the hardware dynamically renames an architectural register identifier used for a destination operand. The renaming may occur after instruction decode. When a source operand is renamed, a previously used physical register number may be mapped to the source operand if that mapping is still valid. Otherwise, a new physical register number from a free list may be mapped to the source operand. When a destination operand is renamed, a new physical register number from the free list is used. When an instruction commits, a physical register storing the instruction destination value becomes a candidate to return to the free list.

When the hardware renames an architectural register identifier with a physical register identifier, the hardware stores the mapping in a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number.

In one embodiment, each of the processor cores 112a-112b includes control logic that determines a given move instruction includes architectural register identifiers both for a source operand and a destination operand. The given move instruction includes architectural register identifiers for the operands rather than an immediate value or an address for a memory location. In response to this determination, the control logic may assign a given rename register number associated with the source operand of the given move instruction to the destination operand of the given move instruction. Each of the source operand and the destination operand are now mapped to a same rename register number. In addition, the control logic may mark the given move instruction to prevent it from proceeding in the pipeline of the processor core. For example, the control logic may mark the given move instruction to indicate completion at the dispatch pipeline stage.

Continuing with implementing the given move instruction as a zero cycle operation, the value of the rename register number used for both the source and the destination operands may also be bypassed to one or more instructions younger in program order than the given move instruction. These one or more younger instructions may be in a same rename group as the given move instruction and be dependent on the given move instruction. The actions of assigning a same rename register number to both the source and the destination operand of the given move instruction and bypassing this rename register number to younger, dependent instructions creates duplicate mappings in the mapping table. This rename register number represents two or more architectural registers.

The control logic may store the multiple mappings for the rename register number. Additionally, the control logic may store a duplicate count for the rename register number. This duplicate count may include the number of times any given architectural register number has been mapped to the rename register number. In various embodiments, the duplicate count may not be incremented for a mapping when a particular architectural register is already mapped to the rename register number at the time of the mapping. Further details and examples of this occurrence are provided later. A data structure referred to as a register duplication array (RDA) may be used for storing both the rename register number and the associated duplicate count. In one embodiment, the RDA may be implemented as a relatively small, tagged, fully-associative structure.

The RDA may have any number of entries for storing a rename register number and an associated duplicate count. The number of entries may be determined with simulations of typical applications. For example, an effective size of the RDA may be 8 entries. However, other numbers of entries may be possible and chosen. In one example, an implementation of an ISA may include 144 physical register numbers, and thus, an 8-bit physical register index may be both stored in an entry of the RDA and used to access the RDA. A duplicate count size may also be determined by simulations of typical applications. In one embodiment, each duplicate count size is 5 bits. Therefore, a maximum number of duplications for a given physical register number is 31. However, another duplicate count size may be possible and chosen.

The RDA or other data structure storing the duplicate information for physical register numbers may be updated before or at the time of instruction dispatch in the processor pipeline. When the control logic determines a decoded instruction is a register-to-register move instruction, the RDA may be accessed to determine whether an entry already exists for the physical register number to be used to rename each of the source operand and the destination operand. If an entry exists, then the associated duplicate count may be incremented each time any given architectural register currently not mapped to the given rename register number is mapped to the given rename register number. Therefore, the duplicate count may be incremented by one or two during the update. If an entry does not already exist in the RDA, then an entry may be allocated and the associated duplicate count may be initiated at two.

The RDA or other data structure storing the duplicate information for physical register numbers may also be updated during a commit pipe stage in the processor pipeline. The duplicate count may be decremented each time the physical register number is ready to return to the free list for any given architectural register during an instruction commit. Again, the physical register number may also be referred to as the rename register number. A physical register number may be a candidate to return to the free list in response to an entry in the mapping table associated with the physical register number is removed or invalidated due to the instruction commit. In one embodiment, in response to the duplicate count decreasing to one, the duplicate count and the duplicate mappings may no longer be stored.

In one embodiment, in response to a given rename register number is a candidate to return to the free list during an associated instruction commit, and no associated duplicate information is stored, such as in the RDA or another data structure, the rename register number is returned to the free list. In another embodiment, in response to a given rename register number is a candidate to return to the free list and the stored duplicate count in the RDA or another data structure is decremented by one to zero, the rename register number is returned to the free list.

In one embodiment, in response to a given rename register number is a candidate to return to the free list and the stored duplicate count is decremented by one to a value greater than one, the rename register number is not returned to the free list. The rename register number still has duplicate mappings to multiple architectural registers in this last case. In one embodiment, the RDA is checked for every zero-cycle move candidate to make sure there is an entry free for tracking a duplicate. If there is not an entry free for allocation within the RDA, then the move instruction is dispatched according to its opcode in a typical manner rather than the move instruction is converted into a zero-cycle move operation. Similarly, if an allocated entry exists for the zero-cycle move candidate, but the duplicate count is already saturated, then the move instruction is dispatched according to its opcode in a typical manner rather than the move instruction is converted into a zero-cycle move operation. Before continuing with further details regarding the conversion of mov instructions to zero-cycle move operations, a further description of the components in the computer system 100 is provided.

In addition to including processor cores 112a-112b connected to corresponding cache memory subsystems 116a-116b, the microprocessor 110 may also include interface logic 118, and a memory controller 120. Other logic and inter- and intra-block communication is not shown for ease of illustration. The illustrated functionality of the microprocessor 110 may be incorporated upon a single integrated circuit. In another embodiment, the illustrated functionality is incorporated in a chipset on a computer motherboard. In some embodiments, the microprocessor 110 may be included in a desktop or a server. In yet another embodiment, the illustrated functionality is incorporated in a semiconductor die on a system-on-a-chip (SOC).

Each of the processor cores 112a-112b may include circuitry for executing instructions according to a given ISA as described earlier. In one embodiment, each of the processor cores 112a-112b may include a superscalar, multi-threaded microarchitecture used for processing instructions of a given ISA. Although multiple general-purpose processor cores are shown in the microprocessor 110, in various other embodiments, the microprocessor 110 may include one or more other specific cores, such as a digital signal processor (DSP), a graphics processing unit (GPU), an application specific integrated circuit (ASIC), and so forth.

Each of the cache memory subsystems 116a-116b may reduce memory latencies for a respective one of the processor cores 112a-112b. In addition, one or more shared cache memory subsystems may be used. A reduced miss rate achieved by the additional memory provided by the cache memory subsystems 116a-116b helps hide the latency gap between a given one of the processor cores 112a-112b and the off-chip memory.

If a cache miss occurs, such as a requested block is not found in a respective one of the cache memory subsystems 116a-116b, then a read request may be generated and transmitted to the memory controller 120. The memory controller 120 may translate an address corresponding to the requested block and send a read request to the off-chip DRAM 140 through the memory bus 122. The memory controller 120 may include control circuitry for interfacing to the memory channels and following a corresponding protocol. Additionally, the memory controller 120 may include request queues for queuing memory requests. The off-chip DRAM 140 may be filled with data from the off-chip disk memory 130.

The off-chip disk memory 130 may provide a non-volatile, random access secondary storage of data. In one embodiment, the off-chip disk memory 130 may include one or more hard disk drives (HDDs). In another embodiment, the off-chip disk memory 130 utilizes a Solid-State Disk (SSD).

The off-chip DRAM 140 may be a type of dynamic random-access memory that stores each bit of data in a separate capacitor within an integrated circuit. Unlike HDDs and flash memory, the DRAM 140 may be volatile memory, rather than non-volatile memory. The off-chip DRAM 140 may include a multi-channel memory architecture. This type of architecture may increase the transfer speed of data to the memory controller 120 by adding more channels of communication between them.

Although only two peripheral devices are shown in the computer system 100 for illustrative purposes, another number of peripheral devices may be connected to the microprocessor 110. One or more of the peripheral devices 150a-150b may be a display including a modern TV or a computer monitor. The computer monitor may include a thin film transistor liquid crystal display (TFT-LCD) panel. Additionally, the display may include a monitor for a laptop and other mobile devices. A video graphics subsystem may be used between the display and the microprocessor 110. The video graphics subsystem may be a separate card on a motherboard and include a graphics processing unit (GPU). One or more of the peripheral devices 150a-150b may be one of a typically utilized input/output device such as a keyboard, mouse, printer, modem, and so forth.

Generally speaking, when a software application is compiled for execution on the microprocessor 110, the application may comprise multiple processes. Each process may own its own resources such as an image of memory, or an instance of instructions and data before application execution. Additionally, each process may include process-specific information such as an address space that addresses the code, data, and possibly a heap and a stack.

Figure 2:
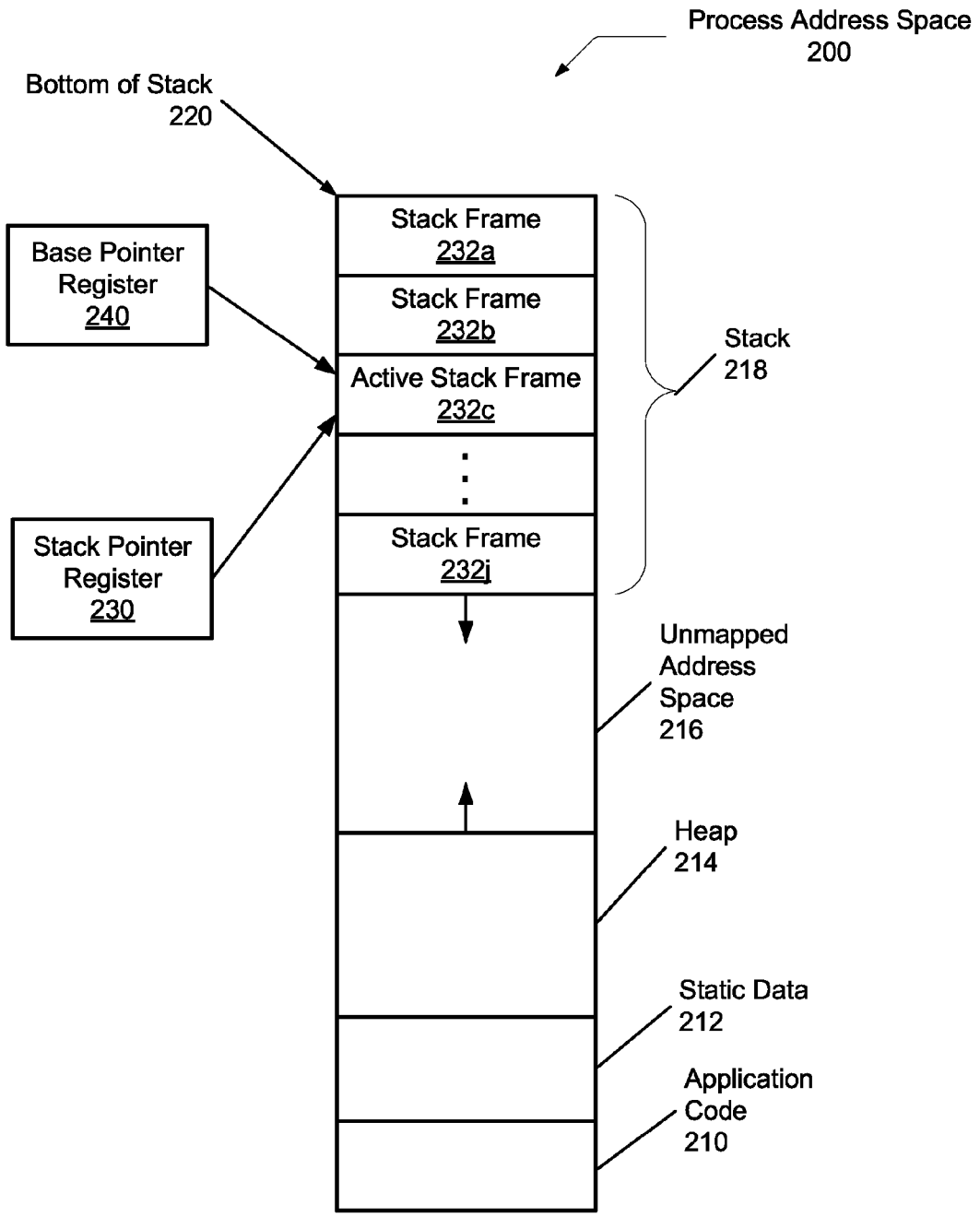
FIG. 2 is a generalized block diagram of one embodiment of a process address space.

Referring to FIG. 2, one embodiment of a generalized process address space 200 is shown. Address space 200 may be a contiguous virtual address space, wherein a mapping between virtual addresses and physical addresses determines the location of values 210-218 in physical memory, such as disk memory and DRAM. Generally speaking, for a given software application, the kernel of an operating system sets up an address space 200 for the application, loads the application's code 210 into memory, sets up a stack 218 for the program, branches to a given location inside the application code 210, and begins execution of the application code 210. In some embodiments, not all code 210 and data 212 need to be stored in physical memory before execution begins. In one embodiment, the static data 212, stack 218, and heap 214 determine data allocation.

Heap 214 may be used to allocate dynamic objects accessed with pointers and are typically not scalar variables. Heap 214 may be used to reduce the frequency of copying the contents of strings and lists by storing the contents of temporary strings or lists during the string/list operations. The heap is not affected by the return of a function call. Static data 212 may be used to allocate global variables and constants.

The stack 218 may be used to allocate scalar variables rather than arrays as used in the static data 212. The stack 218 may include local variables and parameters in the functions currently being invoked. In one embodiment, the stack 218 may begin at the bottom of stack 220 and grow downward. Stack 218 may be grown and shrunk on a subroutine call or return, respectively. Subroutines reduce the cost of developing large, reliable programs. A subroutine may also be referred to as a procedure or as a function.

Each subroutine in execution is assigned a stack frame. A stack frame is a fixed-sized block of memory on the stack and it stores parameters, a return address, local variables and register values. The stack 218 includes stack frames 232a-232j. The stack frame 232c is an active stack frame being used for execution of code. Generally, when a subroutine is called, its associated stack frame is pushed onto the stack 218. The subroutine itself may push and pop temporary storage on the stack. If the subroutine calls other subroutines, the data for the first subroutine may remain on the stack 218 and other called subroutines add corresponding data on the stack 218. As each subroutine terminates, it removes its associated data from the stack 218.

Generally, each subroutine includes a prologue, a body and an epilogue. The subroutine prologue saves a current value of a stack pointer in a base pointer. The subroutine prologue also allocates local variables by decrementing the stack pointer, and saving register values on the stack 218. The stack pointer 230 shown in FIG. 2 stores an address value that points to a last element used on the stack 218, rather than the first free element. The stack pointer 230 may be implicitly adjusted with instructions, such as at least the instruction types push, pop, call and ret. The stack pointer 230 may be one of a number of general-purpose architectural registers defined by a given ISA. For example, the ARM ISA includes a 32-bit integer register named r13 that is architecturally visible to the ARM and Thumb instruction sets. The register r13 has the role of a stack pointer in a procedure call. In another example, the x86 ISA includes a 32-bit general-purpose register named ESX, which is used as a stack pointer. Other registers may be used as a stack pointer for a stack in other ISAs. Regardless of a designated register to use as a stack pointer, the register-to-register move operations used both within and outside the procedure call may be converted to zero cycle move operations. This conversion reduces both instruction latency and power consumption.

The base pointer register 240 may be used to reference subroutine parameters and local variables in the current active stack frame 232c. The base pointer 240 is typically explicitly adjusted. The ARM ISA includes a 32-bit integer register named r14 that is architecturally visible to the ARM and Thumb instruction sets. The register r14 has the role of a link pointer in a procedure call. The link pointer may also be referred to as a base pointer or a frame pointer. In another example, the x86 ISA includes a 32-bit general-purpose register named EBX, which is used as a base pointer. Other registers may be used as a base pointer for a stack in other ISAs. Regardless of a designated register to use as a base pointer, the register-to-register move operations used both within and outside the procedure call may be converted to zero cycle move operations. This conversion reduces both instruction latency and power consumption.

Within the subroutine body, parameters and local variables may be located at constant offsets from the base pointer for the duration of the subroutine execution. The subroutine epilogue mirrors the subroutine prologue. The subroutine caller's register values are recovered from the stack 218, the local variables are deallocated by resetting the stack pointer 230, the subroutine caller's base pointer value is recovered, and the return instruction, ret, is used to return to the appropriate code location in the caller. At least the prologue and the epilogue of the subroutine utilize a register-to-register move operation. A simplified example of the use of a move operation within a subroutine is provided in the following code:

```
SubExample:          // Start of subroutine
                     // Prologue
    push bp          // Save the old base pointer
    mov bp, sp       // Set the new base pointer
    sub sp, n        // Reserve n bytes of local storage
    push reg1        // Save register values that the subroutine
    push reg2        // will modify
                     // Body
                     // do some processing
                     // Epilogue
    pop reg2         // Recover register values
    pop reg1
    add sp, n        // Remove saved n bytes of storage
    mov sp, bp       // Deallocate local variables
    pop bp           // Restore the caller's base pointer
    ret
```

In the above example, the destination operand is listed first followed by the source operand. However, the opposite convention is possible and contemplated. As seen above, the subroutine utilizes at least two register-to-register move operations. The register-to-register move operations shown above affect the base pointer denoted by "bp" and the stack pointer denoted by "sp". In addition, the body of the subroutine may use register-to-register move operations. Machine code statistics may show a significant portion of code utilizes move operations, 2 operands and register operand types. In addition, register-to-register move operations may transfer data between general-purpose registers and specific-purpose registers. Three-dimensional graphics programs may use a single-instruction-multiple-data (SIMD) microarchitecture. The associated SIMD registers may be included in a general-purpose processor that supports multimedia extensions to its ISA. Alternatively, the SIMD registers may be included in a graphics processing unit (GPU). As described earlier, the microprocessor 110 may include specific-purpose processor cores in addition to general-purpose processor cores.

A different mnemonic other than "mov" may be used to distinguish between a general-purpose register-to-register move operation, a general-purpose to specific-purpose register-to-register move operation, and a specific-purpose register-to-register move operation. The above-simplified examples illustrate some uses of the move operation and the potential for its high occurrence in assembly language code. In addition, these move operations typically include the read-after-write (RAW) data dependency, which cause serialization of instruction execution for associated source code segments, reducing throughput.

As briefly described earlier, control logic may convert a register-to-register move operation to a zero cycle move operation by assigning a given rename register number associated with the source operand of the move instruction to the destination operand of the move instruction. Each of the source operand and the destination operand are now mapped to a same rename register number. In addition, the control logic may mark the move instruction to prevent it from proceeding in the pipeline of the processor core. For example, the control logic may mark the given move instruction to indicate completion at the dispatch pipeline stage. Further, the value of the rename register number used for both the source and the destination operands may be bypassed to one or more instructions younger in program order than the move instruction. In the remainder of the description below, examples are given of register renaming and register renaming when creating a zero cycle move operation. Implementations of control logic in the pipeline stages are shown followed by examples of retiring instructions when created zero cycle move operations are present.

Figure 3:
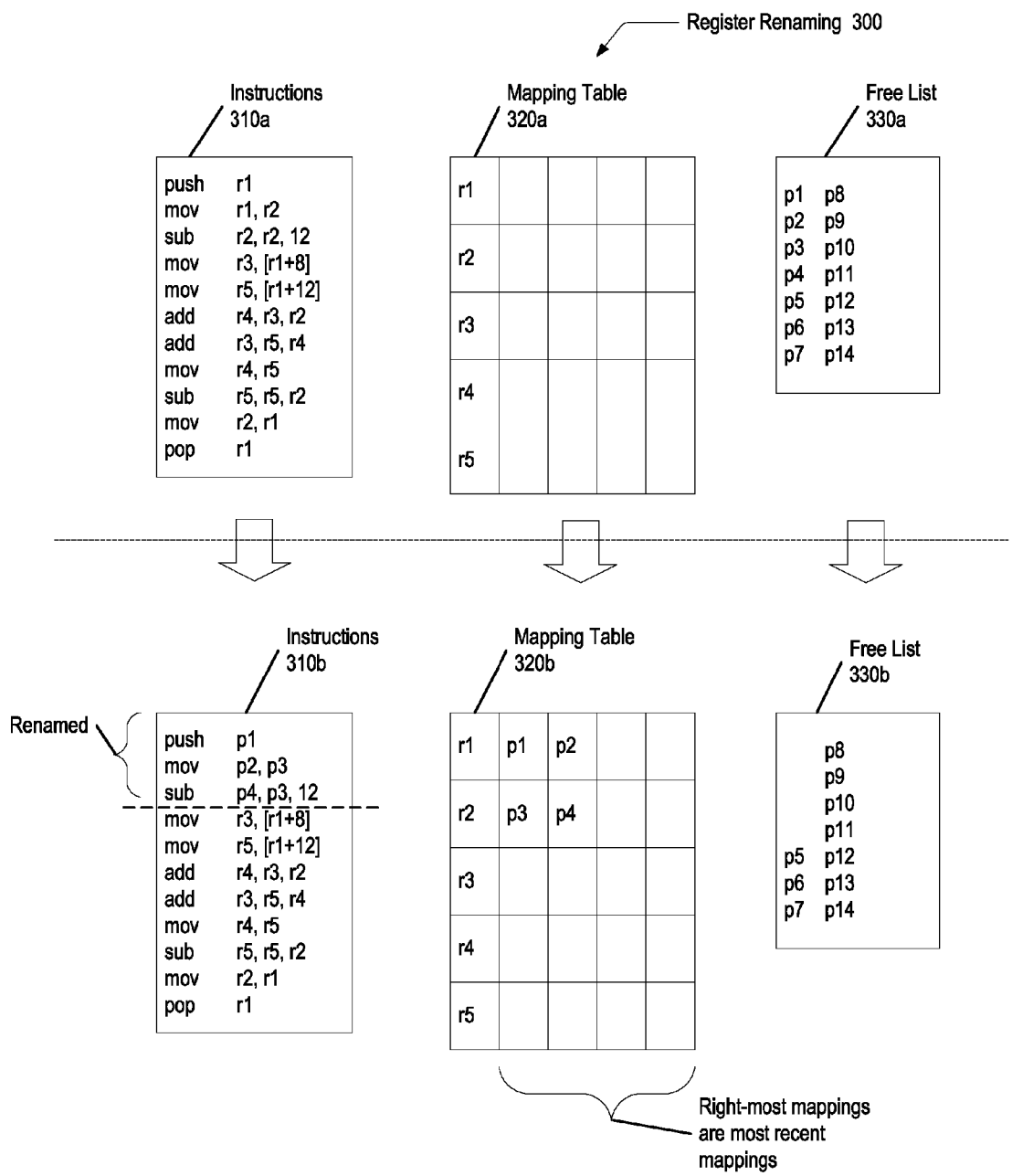
FIG. 3 is a generalized block diagram of one embodiment of register renaming.

Turning now to FIG. 3, a generalized block diagram illustrating one embodiment of register renaming 300 is shown. FIG. 3 generally depicts instructions 310, mapping table 320, and free list 330 before (upper portion of figure) and after (lower portion of figure) a rename operation. A simplified example of a subroutine includes the instructions 310a. In this example, a destination operand is listed first after an instruction mnemonic followed by one or more source operands. Registers use the general nomenclature of "r" followed by a register identifier. For example, register 1 is denoted by "r1". Although data conversions may be performed and data transfers between general-purpose and specific-purpose registers may occur in addition to data transfers between a first specific-purpose register set and a second specific-purpose register set may occur, this example does not show these scenarios for ease of illustration. However, such data conversions and data transfers are possible and contemplated.

The instructions 310a are meant to be a pseudocode example and language agnostic. For example, the fourth and fifth instructions read contents of a memory into architectural registers r3 and r5. This type of operation may be performed with the general load instructions shown in the example. In a selected ISA, such as ARM, a particular read request instruction may be used. For the ARM ISA, a single register data transfer instruction may be used, such as "ldr r3, [r1, #8]". In other embodiments, a different ISA may be selected which uses a different instruction syntax.

As shown, the instructions 310a utilize the subroutine formats for a prologue, a body, and an epilogue. Although these formats are used here, other embodiments may utilize other formats. As shown, the instructions 310a utilize five registers labeled r1-r5. The mapping table 320a generally shows a data structure for storing mappings between architectural register numbers and physical register numbers. It is noted that while the discussion here uses register "numbers", other embodiments could use other types of identifiers to distinguish registers from one another. The free list 330a shows the physical register numbers available for renaming purposes. In this example, there are 14 physical register names using the general nomenclature of "p" followed by a register identifier. As such, free list 330a shows physical registers p1-p14 are available for register renaming.

Referring to the instructions 310b, these instructions are the same as the instructions 310a; however, register renaming has occurred for the first three instructions. While the example shows three instructions having had registers renamed, any number of instructions per pipeline stage may be chosen for simultaneous processing. The mapping table 320b stores the mappings for the renamed registers. Here, the register r1 is renamed to p1 for the push instruction. For the mov instruction, the destination operand, or register r1, is renamed to p2 and the source operand, or register r2, is renamed to p3. For the sub instruction, the destination operand, or register r2, is renamed to p4 and the source operand, or register r2, uses the previous rename value, which is p3.

Figure 4:
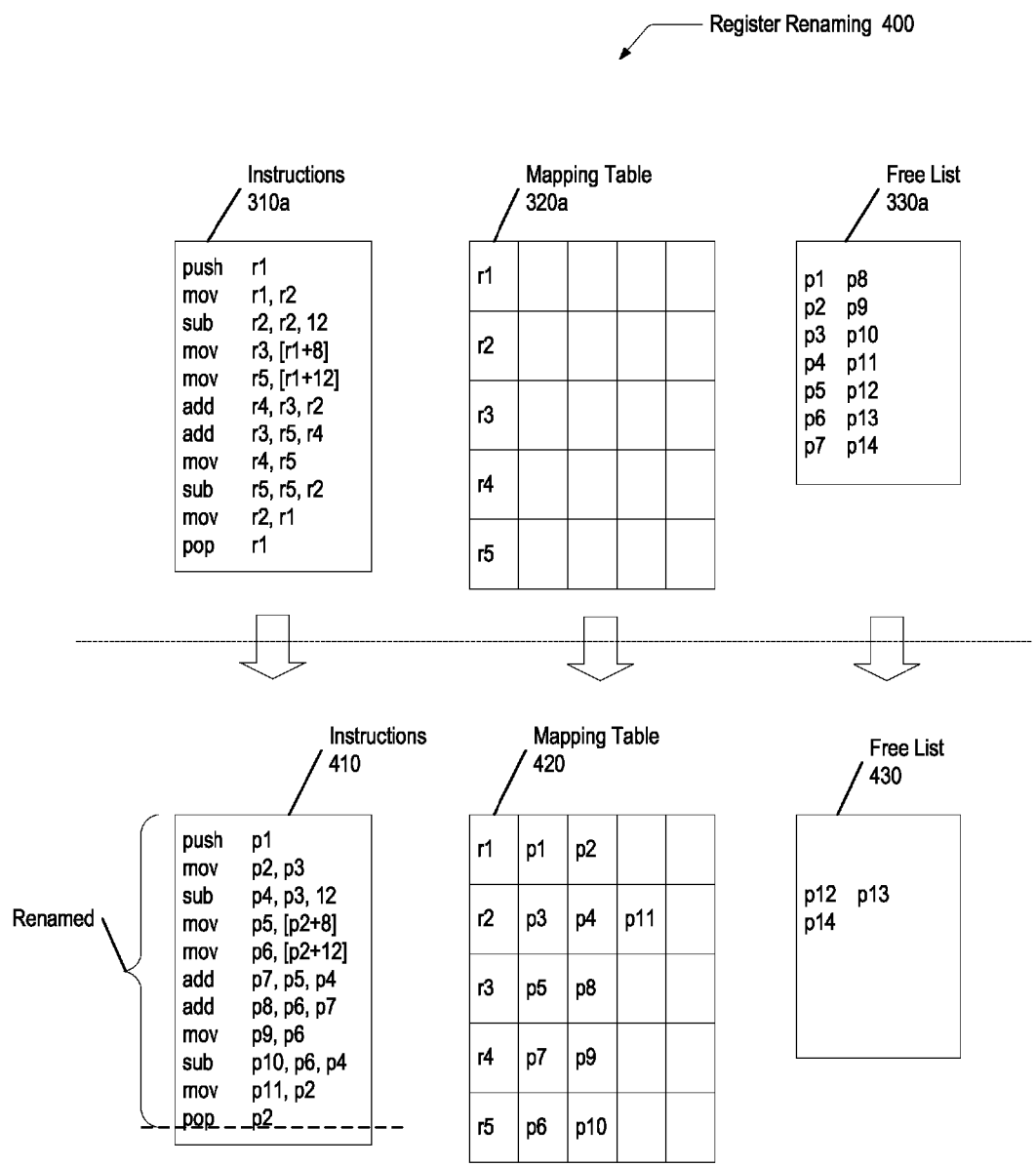
FIG. 4 is a generalized block diagram of another embodiment of register renaming.

Turning now to FIG. 4, a generalized block diagram illustrating another embodiment of register renaming 400 is shown. The example shown in the register renaming 400 is a continuation of the example shown in the register renaming 300. Referring to the instructions 410, these instructions are the same as the instructions 310a and 310b, however, register renaming has occurred for all of the instructions shown.

The mapping table 420 shows the stored mappings between architectural register numbers and physical register numbers. The free list 430 shows physical registers p12-p14 are still available after each of the renaming operation. The physical registers p1-p11 have been used to rename architectural registers r1-r5 in the instructions 410. In particular, register r1 has been renamed to p1 and p2 (e.g., noted as r1:p1, p2), r2:p3, p4, p11; r3:p5, p8; r4:p7, p9; and r5:p6, p10.

Figure 5:
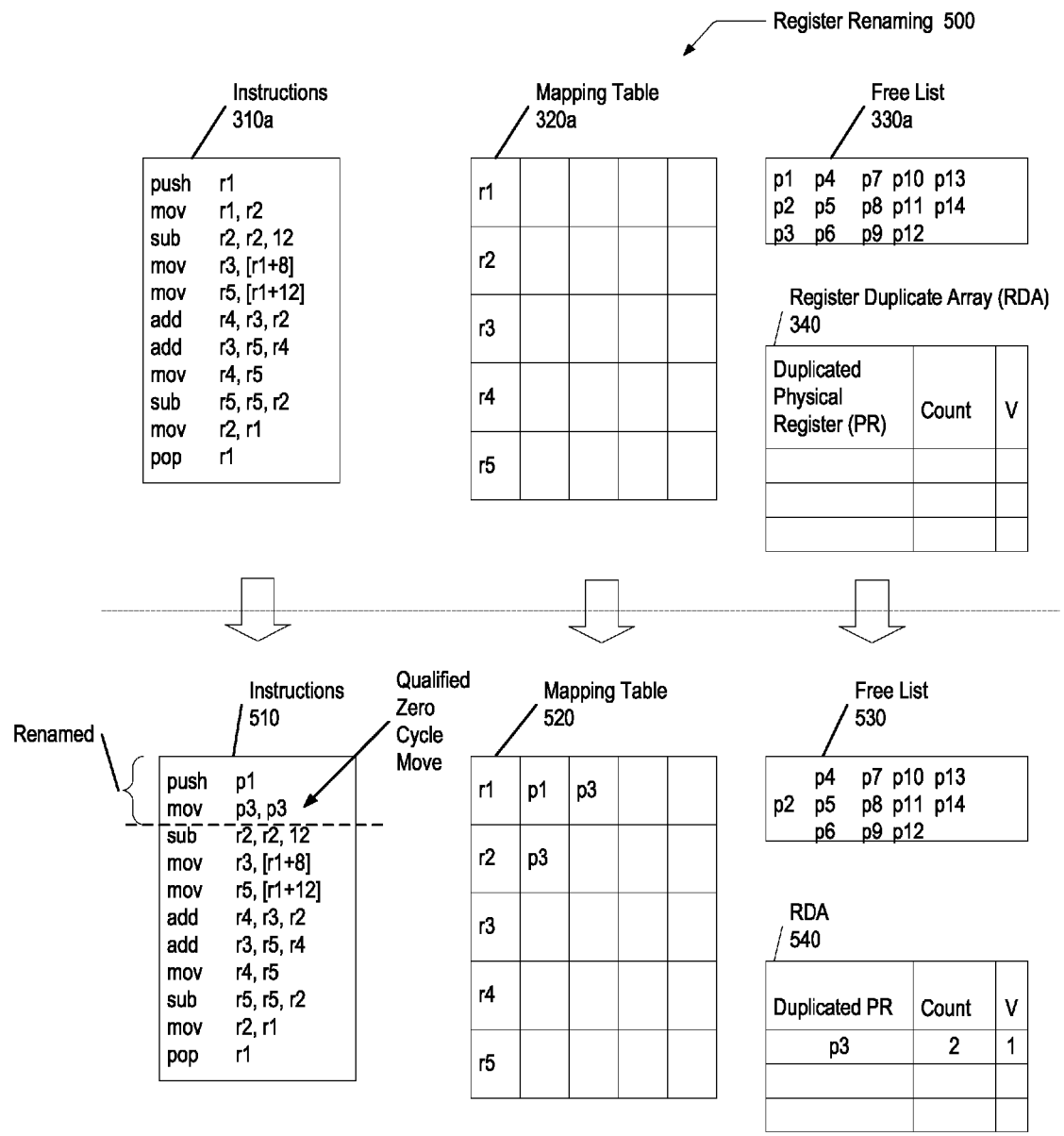
FIG. 5 is a generalized block diagram of one embodiment of register renaming with zero cycle move operations.

Turning now to FIG. 5, a generalized block diagram illustrating one embodiment of register renaming 500 with zero cycle move operations is shown. The example shown in the register renaming 500 utilizes the instructions 310a from the example shown in FIG. 3. The mapping table 320a and the free list 330a are also from the example shown in FIG. 3. In this example, a zero cycle move operation is shown and a register duplication array (RDA) is shown which stores an indication of duplicate mappings. An example of the RDA both prior to register renaming and once register renaming begins is shown as RDA 340 and RDA 540, respectively. The RDA 340 is empty prior to register renaming. The RDA 540 shows allocated entries as qualified zero cycle move operations are processed within the instructions. Further details of the RDA are provided below. Hardware support for duplicating the mapping for the source physical register may include a data structure for maintaining a duplicate count for the physical register. For example, RDA 540 is configured to maintain a duplicate count for multiple physical registers. As will be discussed further below, entries in RDA 540 may be allocated for a register-to-register move instruction with a source architectural register that has not already been renamed. However, if RDA 540 is already full, then duplication resources may not be available and no entry allocated.

Referring to the instructions 510, renaming has occurred for the first two instructions. The mapping table 520 stores the mappings for the first two instructions. Here, the register r1 is renamed to p1 for the push instruction. The second instruction, the mov instruction, qualifies to be converted to a zero cycle move operation. In one embodiment, one qualifier is the move operation is a register-to-register operation. Another qualifier is there exists support to store duplicate renaming mappings. For the mov instruction, the destination operand (r1) is renamed to a register rename number used for the source operand. The source operand, or register r2, is renamed to p3. Therefore, the destination operand, or register r1, is also renamed to p3. The free list 530 shows that the physical registers p1 and p3 are no longer available for mappings. However, as will be discussed more fully below, the physical register p3 may be reused despite not being in the free list 530.

The mappings for the first two instructions are shown in the mapping table 520. As shown, the physical register number p3 is mapped twice—once for architectural register r2 and once for architectural register r1. This is a duplicate mapping. The register duplication array (RDA) 540 stores an indication of the duplicate mapping. For example, an entry in the RDA 540 stores an identifier of the duplicated physical register, p3, and an associated duplicate count for the duplicated physical register. A valid bit (V) may be used to indicate a valid allocated entry. This entry stores a duplicate count value of 2, since the physical register p3 has two mappings shown in the mapping table 520.

Figure 6:
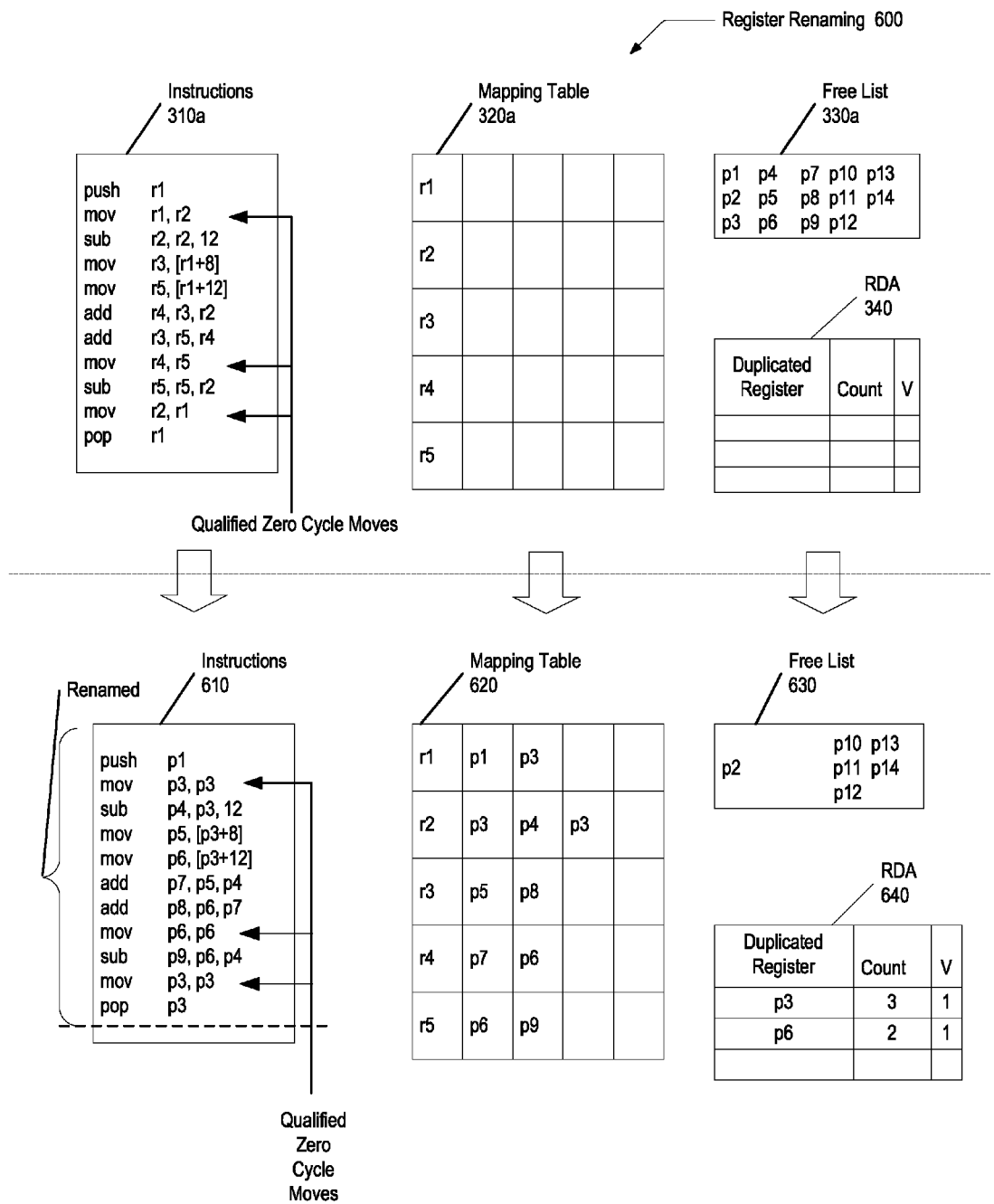
FIG. 6 is a generalized block diagram of another embodiment of register renaming with zero cycle move operations.

Turning now to FIG. 6, a generalized block diagram of continued register renaming 600 of the example with zero cycle move operations presented in FIG. 5 is shown. The example shown in the continued register renaming 600 utilizes the instructions 310a from the example shown in FIG. 3. The mapping table 320a and the free list 330a are also from the example shown in FIG. 3. FIG. 6 shows mapping table 620 with the stored mappings between architectural register numbers and physical register numbers after renaming of all of the instructions in the example. The free list 630 shows physical registers p2 and p10-p14 are still available after each one of the instructions 610 have been renamed. The physical registers p1 and p3-p9 have been used to rename architectural registers r1-r5 in the instructions 610.

Using the second mov instruction as an example, this instruction is a register-to-register operation that qualifies to be converted to a zero cycle move operation and the destination operand (r4) is renamed to the register name used for the source operand. As the source operand (r5) has been renamed to p6 (as will be discussed below), the destination operand (r4) is also renamed to p6. In this example, the register p6 was not in the free list 630 by the time registers for the second mov instruction were being renamed. The physical register p6 was previously mapped to r5 during processing of the second load instruction. However, at the time of processing the second mov instruction, the RDA 640 is able to maintain duplicate mapping information for the physical register p6. In one embodiment, duplicate mapping information may include a physical register identifier and an associated duplicate mapping count stored in an allocated entry. In one embodiment, the duplication count for each of the physical registers may be represented by a particular number of bits (e.g., five bits). In such an embodiment, once the count reaches a maximum value (e.g., 31 for five bits), the duplication count may be deemed saturated an no further duplications available for that register. In the example shown, p6 is not saturated and further duplication is possible.

In the example of FIG. 6, the third mov instruction also qualifies to be converted to a zero cycle move operation. For the third mov instruction, the destination operand, r2, is renamed to a register name used for the source operand. The source operand, r1, has already been renamed to p3. Therefore, the destination operand, r2, is also renamed to p3. Similar to the above, the physical register p3 was not in the free list 630 by the time the third mov instruction was being renamed. The physical register p3 was previously mapped to each of r1 and r2 during processing of the first mov instruction. However, at the time of processing the third mov instruction, the RDA 640 is able to continue maintenance of duplicate mapping information for the physical register p3. When the third mov instruction is processed, an associated entry in the RDA 640 has already been allocated and the duplicate count for the physical registers p3 is not saturated. Therefore, the duplicate count stored in the RDA 640 for the physical register p3 is updated. For example, the duplicate count is incremented from 2 to 3.

Figure 7:
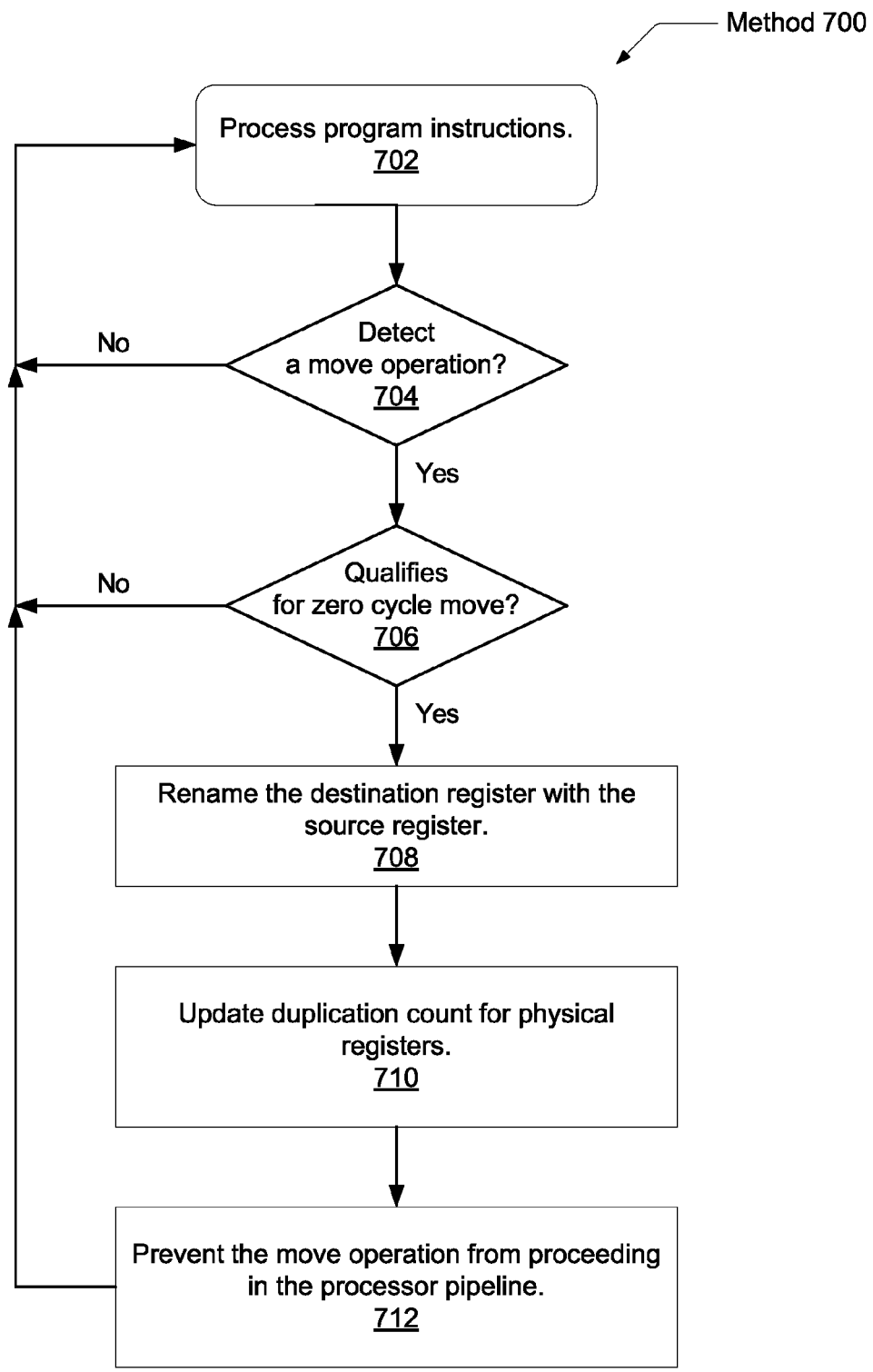
FIG. 7 is a generalized flow diagram illustrating one embodiment of a method for creating zero cycle move operations.

Referring now to FIG. 7, a generalized flow diagram of one embodiment of a method 700 for creating zero cycle move operations is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 702, program instructions are processed. The instructions may be compiled, fetched from memory, decoded and executed. After decoding, if a given instruction is detected to be a move operation (conditional block 704), then a determination may be made as to whether the move operation qualifies to be a zero cycle move operation. One qualifier may be the move operation is a register-to-register move instruction. Another qualifier may be whether the hardware currently is able to maintain duplicate mapping information for the move operation. For example, in one embodiment, a data structure, such as the RDA 640, may be used. If the RDA 640 has an available entry and a duplicate count within this entry is not already saturated, then the move operation may qualify to be converted to a zero cycle move operation.

If the move operation qualifies to be converted to a zero cycle move operation (conditional block 706), then in block 708 the destination operand is renamed with a same physical register identifier as the source operand. If an entry in the RDA 640 is not already allocated for this particular physical register number, and the RDA 640 is not already full, then an entry may be allocated for this physical register. In block 710, RDA 640 is updated with a duplication count for the physical register. The duplicate count may be incremented each time a given architectural register currently not mapped to the rename register is mapped to the rename register. Referring again to FIG. 5 and FIG. 6, the duplicate count for the physical register p3 is incremented by one for the fifth mov instruction. In one embodiment, the duplicate count may be initialized with a value of two. However, other embodiments are possible and are contemplated. In a case where the initial value is 2, the duplicate count for p3 is incremented to 3.

In block 712, the mov instruction may be marked (or an indication otherwise stored) in a manner to prevent it from being processed in the pipeline in an ordinary manner. Rather, in one example, the mov instruction is marked as complete at a dispatch pipeline stage. Therefore, the mov instruction consumes zero pipe stages and clock cycles for execution. In other examples, the mov instruction is marked as complete in another pipeline stage that is prior to an execution pipeline stage. As done with other renamed architectural registers, the physical register selected for renaming both the destination and the source operands may be bypassed to younger in-program-order instructions that have a data dependency on the mov instruction.

Figure 8:
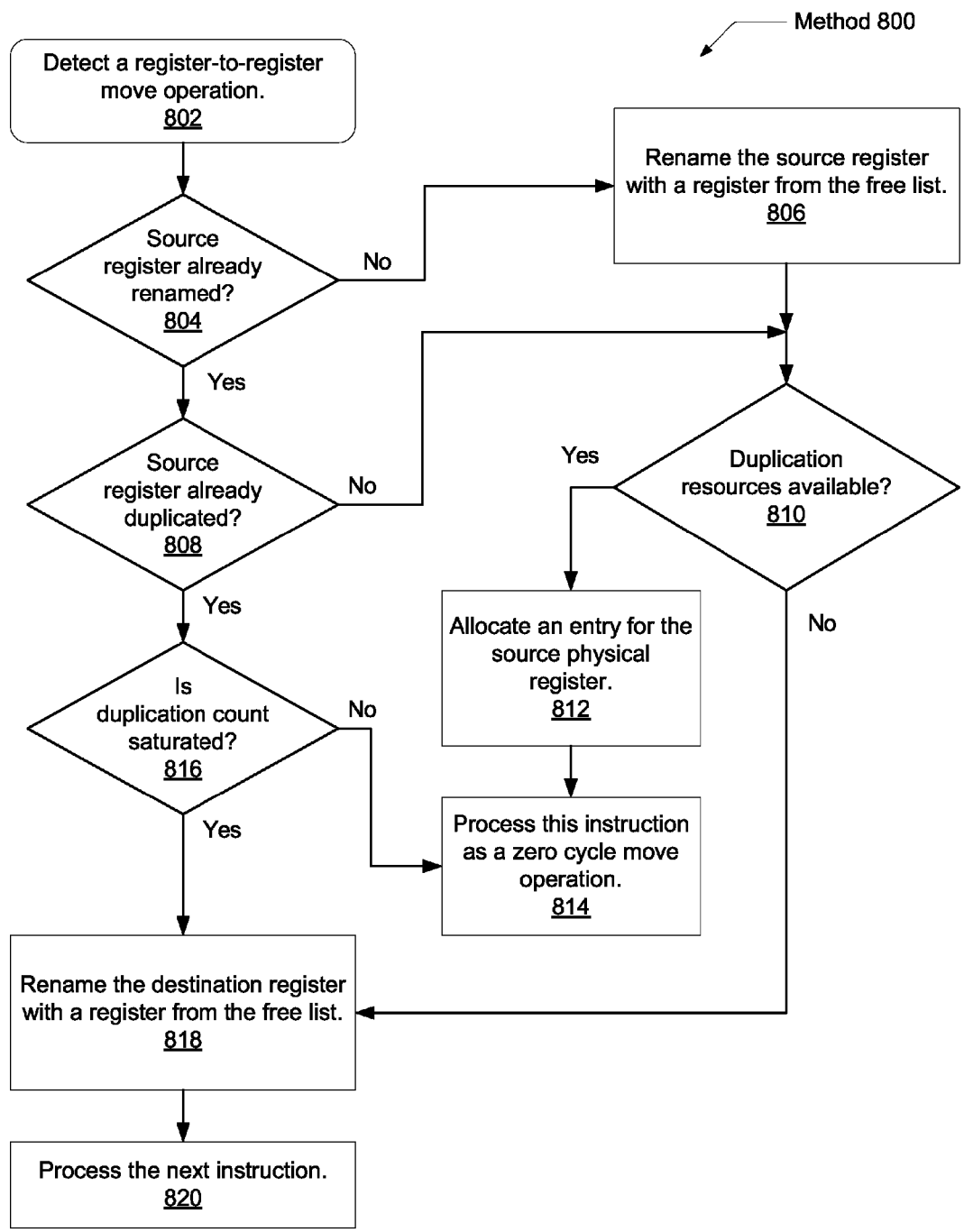
FIG. 8 is a generalized flow diagram illustrating another embodiment of a method for determining qualification for instruction conversion to zero cycle move operations.

Referring now to FIG. 8, a generalized flow diagram of one embodiment of a method 800 for determining qualification for instruction conversion to zero cycle move operations is shown. In block 802, a given instruction is detected to be a register-to-register move operation. A determination is then made as to whether the source register has already been renamed (conditional block 804). For example, an access of the mapping table 620 may determine whether the source architectural register has already been renamed. If the source architectural register has not already been renamed (conditional block 804), then in block 806 the source architectural register is renamed with a physical register from the free list. It is noted that in various embodiments, all architectural registers are renamed. In which case, one or both of blocks 804 and 806 may be unnecessary. Various such embodiments are possible and are contemplated.

If in conditional block 810 it is determined there are no further duplication resources available (e.g., if the RDA 640 is full and all entries have been allocated), then in block 818 the destination architectural register is renamed with a physical register number from the free list. The renamed identifiers, an associated program counter (PC) value, dependency vectors, and so forth may be sent to a dispatch queue and later to a scheduler. In block 820, a next available instruction may be processed. The next available instruction may be processed in parallel with the above steps or in a subsequent clock cycle. If duplication resources are available (conditional block 810), then in block 812 an entry may be allocated (e.g., in the RDA) for the source physical register and in block 814 this particular instruction may be processed as a zero cycle move operation. For example, the steps described in blocks 708-712 in method 700 may be used.

If in block 804 the source architectural register of the register-to-register move instruction is already renamed, then a determination may be made as to whether the corresponding renamed register number has been duplicated. For example, the physical register number may be used to index into a data structure such as the RDA 640. A hit in the RDA may indicate the source physical register is already duplicated. A miss may indicate the source physical register is not already duplicated. If the source physical register is not already duplicated (conditional block 808), then control flow of method 800 moves to conditional block 810. Otherwise, a duplicate count for the renamed source physical register may be compared to a given threshold. In one embodiment, the threshold may correspond to some particular a count. If an associated duplicate count has not reached the threshold (conditional block 816), then control flow of method 800 moves to block 814. If the associated duplicate count has reached the threshold (conditional block 816), then control flow of method 800 moves to block 818.

Figure 9:
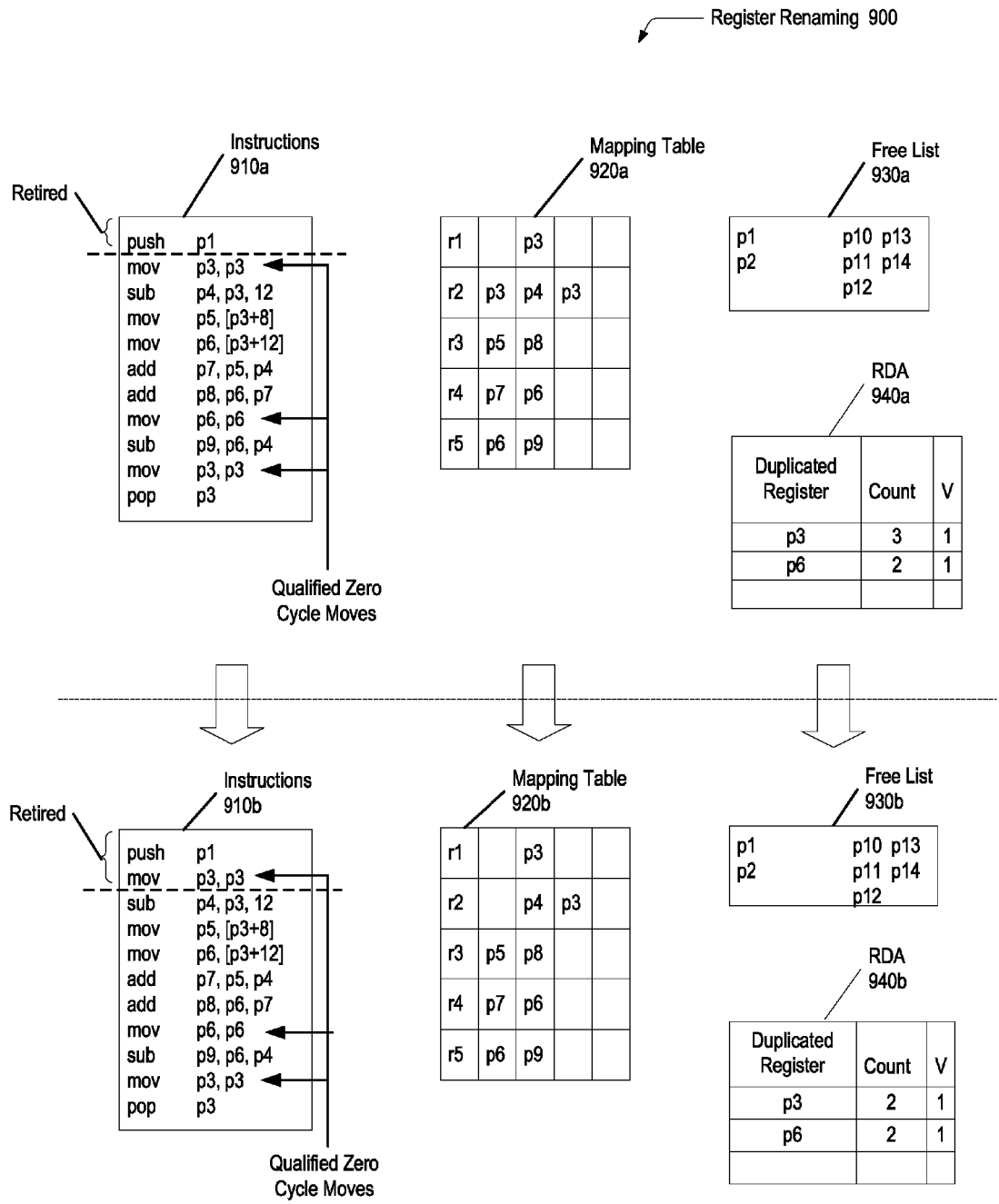
FIG. 9 is a generalized block diagram of one embodiment of register renaming during retirement of code with zero cycle move operations.

Turning now to FIG. 9, a generalized block diagram illustrating one embodiment of register renaming 900 during retirement of instructions with zero cycle move operations is shown. The example shown in FIG. 9 is a continuation of the example shown in FIG. 6. Here, renaming has completed and now instructions are being retired in-order. The instructions 910a are the same as instructions 610, which are the instructions 310a after each instruction has operands renamed.

The mapping table 920a and the free list 930a have the same values as the mapping table 620 and the free list 630, respectively, except for updates corresponding to the first instruction being retired. The mapping table 920a shows the stored mappings between architectural register numbers and physical register numbers after the first instruction has been retired. The physical register p1 mapped to the architectural register r1 has been removed from the mapping table 920a and returned to the free list 930a.

Referring to the instructions 910b, the first two instructions, including the first zero cycle mov instruction, have been retired. Selecting a given number of instructions as retired is done for illustrative purposes and does not determine the retirement process by indicating a number of instructions being simultaneously retired in a given pipeline stage. Any number of instructions per pipeline stage may be chosen for simultaneous retirement and depends on a particular microarchitecture. In addition to the physical register p1 being removed from the mapping table 920b, the physical register p3 is removed from one entry in the mapping table 920b.

The oldest mapping between the physical register p3 and the architectural register r2 is removed from the mapping table 920b. The use of r2 as a renamed register p4 occurs in the next instruction, so the current mapping, which is the oldest mapping, to p3 is no longer utilized for r2. However, the younger mapping between the registers r2 and p3 remains. In addition, the mapping between the physical register p3 and the architectural register r1 remains. Therefore, the physical register p3 still has two mappings within the mapping table 920b, and thus, the physical register p3 is not returned to the free list 930b.

The RDA 940b is updated with the current number of mappings for the physical register p3, which are 2 mappings. The duplicate count for the physical register p3 is decremented. Generally, a duplicate count is decremented each time an associated rename register number is ready to return to the free list for any given architectural register. A rename register number may be determined to be ready to return to the free list in response to a mapping is removed from the mapping table. Typically, a rename register number is returned to the free list in response to a mapping is removed from the mapping table. However, with duplicate mappings in the mapping table due to zero cycle move operations, the RDA 940b may be inspected prior to any return to the free list.

In one embodiment, in response to a given duplicate count decreases to one, the duplicate count and the associated duplicate mappings may no longer be stored in the RDA 940b. When a given rename register number is a candidate to return to the free list 930b during an associated instruction commit, and no associated duplicate information is found to be stored in the RDA 940b, the rename register number is returned to the free list 930b. In another embodiment, in response to a given duplicate count decreases to one, the duplicate count and the associated duplicate mappings may still be stored in a valid entry in the RDA 940b. When a given rename register number is a candidate to return to the free list 930b during an associated instruction commit, and associated duplicate information is found in the RDA 940b with a duplicate count of one, the rename register number is returned to the free list 930b. In addition, the duplicate count may be decremented to zero. Alternatively, the entry in the RDA 940b may be invalidated.

Figure 10:
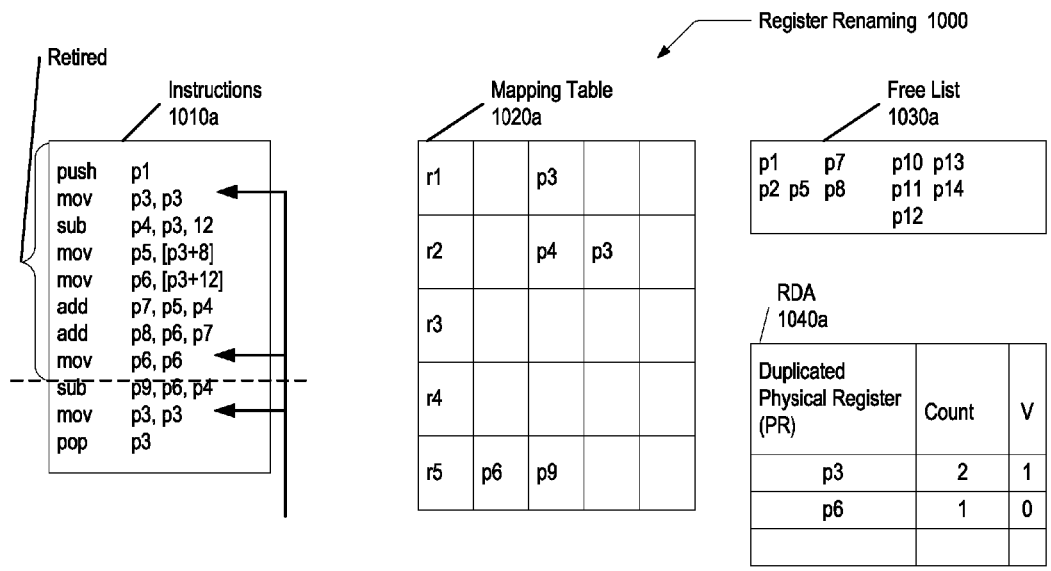
FIG. 10 is a generalized block diagram of another embodiment of register renaming during retirement of code with zero cycle move operations.
Figure 10:
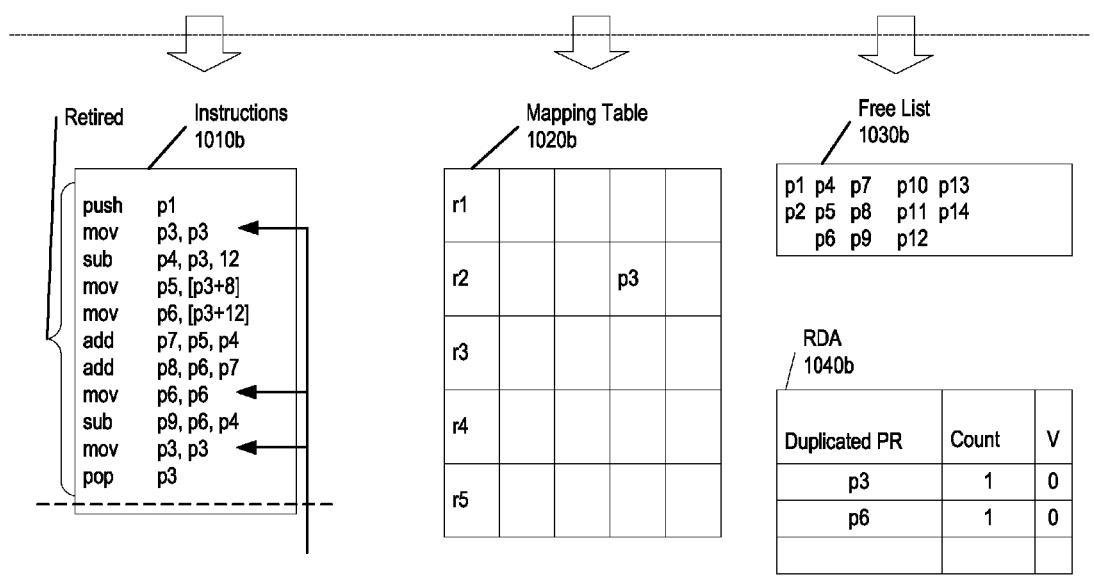

Referring now to FIG. 10, a generalized block diagram illustrating another embodiment of register renaming 1000 during retirement of code with zero cycle move operations is shown. The example shown in the register renaming 1000 is a continuation of the example shown in the register renaming 900. Referring to the instructions 1010a, these instructions are the same as the instructions 920b, however, retirement has occurred for all but the last three instructions.

The mapping table 1020a shows the stored mappings between architectural register numbers and physical register numbers after all but three instructions have retired. The free list 1030a shows physical registers p1-p2, p5, p7-p8, and p10-p14 are available for mappings at this point. The physical registers p3, p4, p6 and p9 are still being used to rename architectural registers r1, r2 and r5 in the instructions 1010a.

The youngest mapping for the physical register p6, which occurred for the second mov instruction and for the architectural register r4, is removed from the mapping table 1020a. The oldest mapping for the physical register p6, which occurred for the second load instruction and for the architectural register r5, remains in the mapping table 1020a. Therefore, the physical register p6 still has one mapping within the mapping table 1020a, and thus, the physical register p6 is not returned to the free list 1030a. The RDA 1040a is updated with the current number of mappings for the physical register p6, which is 1 mapping. The duplicate count for the physical register p6 is decremented from two to one. Again, a duplicate count may be decremented each time an associated rename register number is ready to return to the free list for any given architectural register.

In one embodiment, in response to a given duplicate count decreases to one, such as the case for physical register p6, the duplicate count and the associated duplicate mappings may no longer be stored in the RDA 1040a. The entry in the RDA 1040a may be invalidated. When a given rename register number is a candidate to return to the free list 1030a during an associated instruction commit, and no associated duplicate information is found to be stored in the RDA 1030a, the rename register number is returned to the free list 1030a. In another embodiment, in response to a given duplicate count decreases to one, such as the case for physical register p6, the duplicate count and the associated duplicate mappings may still be stored in a valid entry in the RDA 1040a. When a given rename register number is a candidate to return to the free list 1030a during an associated instruction commit, and associated duplicate information is found in the RDA 1040a with a duplicate count of one, the rename register number is returned to the free list 1030a. In addition, the duplicate count may be decremented to zero. Alternatively, the entry in the RDA 1040a may be invalidated. In the example shown in FIG. 10, the duplicate count for physical register p6 is decremented from 2 to 1, and the associated entry in the RDA 1040a is invalidated.

Referring to the instructions 1010b, these instructions are the same as the instructions 1010a, however, instruction commit has occurred for each of the instructions. In one embodiment, instruction commit and instruction retirement occur in a same pipeline stage. In other embodiments, results are committed in a first pipeline stage and the associated instruction is retired and removed from a retirement window in a later second pipeline stage. For purposes of returning physical register numbers to a free list and updating a data structure, such as the RDA 1040b, the actions may take place when the instruction commits.

The mapping table 1020b shows a mapping still exists between the physical register p3 and the architectural register r2. In one embodiment, this mapping may remain until the architectural register r2 is used again as a destination operand in subsequent code that is not shown. For example, other code or another subroutine may be called afterward and the value stored in the architectural register r2 may be used. In another embodiment, the mapping may be removed when a subsequent ret instruction (not shown) is committed. In yet another embodiment, the mapping may be removed when the pop instruction is committed. In such a cases, the mapping table 1020b would be empty. The free list 1030b currently shows all physical register numbers except p3 are available for renaming. However, in the cases that the mapping between the physical register p3 and the architectural register r2 is removed, the free list 1030b would show all physical register numbers p1-p14 are available for renaming.

When the last mov instruction is committed, the physical register p3 may not become a candidate for returning to the free list 1030b. The architectural register r2, which is used as a destination operand for the last mov instruction, may be used in later code. The architectural register r1, which is used as a source operand for the last mov instruction, is used in the subsequent pop instruction. Therefore, for this case, the physical register p3 may not yet become a candidate for returning to the free list 1030b. Consequently, the RDA 1040b may not be indexed by the physical register p3.

When the last instruction, which is the pop instruction, is committed, the physical register p3 may become a candidate for returning to the free list 1030b. The mapping between the physical register p3 and the architectural register r1 may be removed from the mapping table 1020b. The RDA 1040b may be indexed with the value of the physical register number p3 and a valid entry is found with a duplicate count of two. The duplicate count may be decremented from two to one.

As described earlier, a duplicate count is decremented each time an associated rename register number is ready to return to the free list for any given architectural register. A rename register number may be determined to be ready to return to the free list in response to a mapping is removed from the mapping table. In the case of the last instruction, which is the pop instruction, the mapping between the physical register p3 and the architectural register r1 is removed from the mapping table 1020b. Typically, a rename register number is returned to the free list in response to a mapping is removed from the mapping table. However, with duplicate mappings in the mapping table due to zero cycle move operations, the RDA 1040b may be inspected prior to any return to the free list.

In the example shown, the duplicate count for the physical register p3 is decremented from 2 to 1 and the associated entry is invalidated. Therefore, when a subsequent instruction commits that causes the mapping between the physical register p3 and the architectural register r2 to be removed from the mapping table 1020b, no valid entry will be found in the RDA 1040b, and the physical register p3 may be returned to the free list 1030b. Alternatively, the duplicate count for the physical register p3 is decremented from 2 to 1 and the associated entry may remain valid. Therefore, when a subsequent instruction commits that causes the mapping between the physical register p3 and the architectural register r2 to be removed from the mapping table 1020b, a valid entry will be found in the RDA 1040b with a duplicate count of one, and the physical register p3 may be returned to the free list 1030b.

Figure 11:
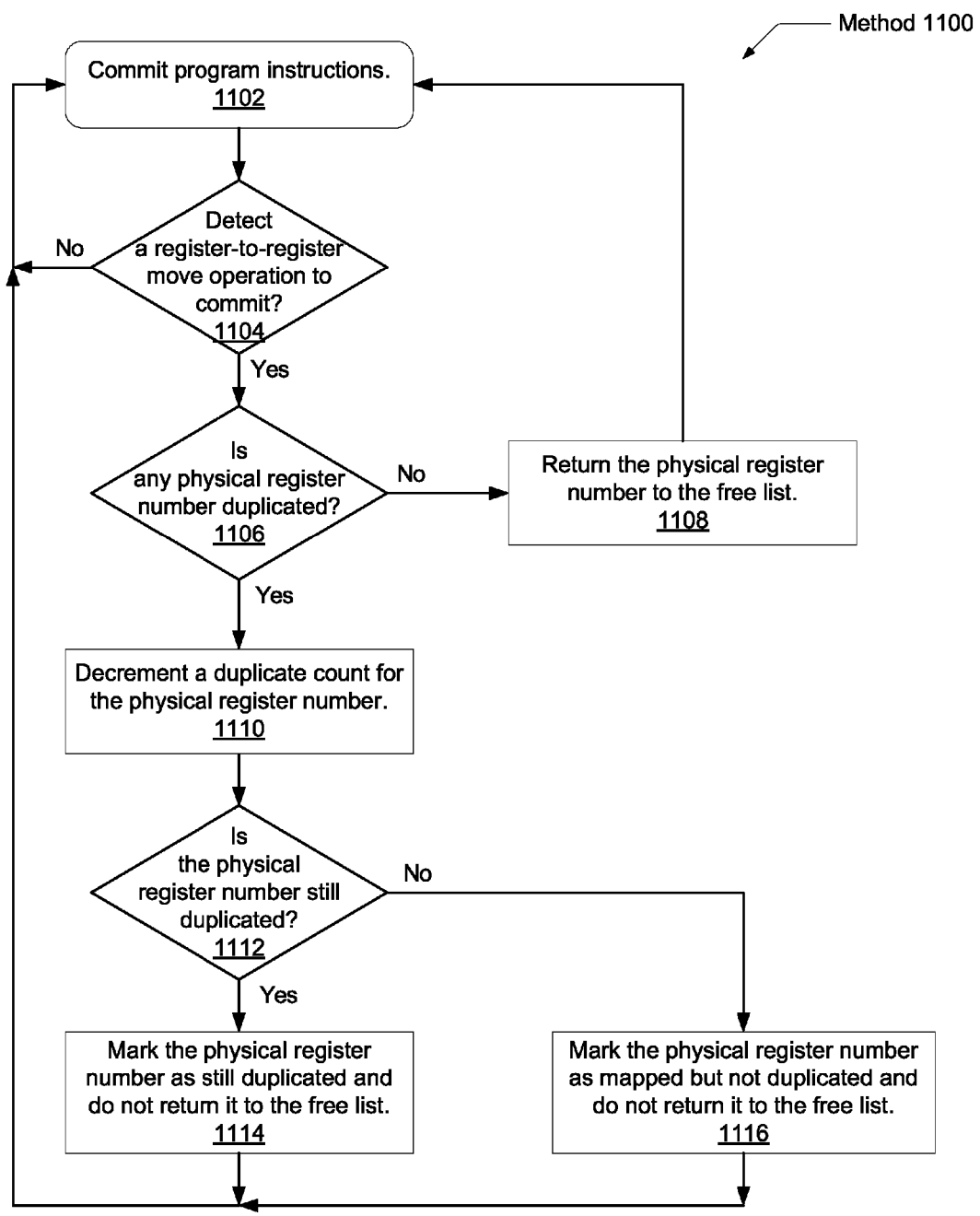
FIG. 11 is a generalized flow diagram illustrating one embodiment of a method for committing instructions that include zero cycle move operations.

Referring now to FIG. 11, a generalized flow diagram of one embodiment of a method 1100 for committing instructions that include zero cycle move operations is shown. In block 1102, program instructions are being committed. An in-order window of instructions within a data structure may be used to determine when to commit and retire instructions. For example, a reorder buffer (ROB) may be used as the data structure. If an instruction to commit is detected to be a register-to-register move operation (conditional block 1104), then a check may be performed to determine whether both the destination physical register and the source physical register is duplicated, the destination physical register is not duplicated, but the source physical register is duplicated; or neither the destination physical register nor the source physical register is duplicated. In one example, an associated duplicate flag or field indicating a status of duplication for each of the destination and the source physical registers may be stored with other associated information for the instruction.

In another example of determining whether a physical register is duplicated at a commit pipe stage, a comparison and resulting match between the source physical register and the destination physical register may determine each of the destination and the source physical register is duplicated. In this case, the destination and the source physical register number is the same value. In yet another example, each of the destination and the source physical register may be used to index into a data structure such as the RDA 640. A hit may indicate a corresponding physical register is already duplicated. A miss may indicate the corresponding physical register is not already duplicated. For a corresponding physical register, if the physical register number used for renaming is not duplicated (conditional block 1106), then in block 1108, the physical register number is returned to the free list. Otherwise, in block 1110, a duplicate count for the corresponding physical register number may be decremented. Generally, a duplicate count is decremented each time an associated physical register number is ready to return to the free list for any given architectural register. A rename register number may be determined to be ready to return to the free list in response to a mapping is removed from the mapping table. Typically, a rename register number is returned to the free list in response to a mapping is removed from the mapping table. However, with duplicate mappings in the mapping table due to zero cycle move operations, a data structure, such as the RDA, may be inspected prior to any return to the free list.

After the duplicate count is decremented, if the physical register number is still duplicated (conditional block 1112), then in block 1114, the physical register number may be marked as still duplicated and it is not returned to the free list. For example, a valid entry in a data structure, such as the RDA, may still be present with a duplicate count greater than one. After the duplicate count is decremented, if the physical register number is not still duplicated (conditional block 1112), then in block 1116, the physical register number may be marked as mapped but not duplicated. For example, an associated entry in a data structure, such as the RDA, may be invalidated. Alternatively, a valid entry may still be present with a duplicate count of one. The physical register number is not returned to the free list.

Figure 12:
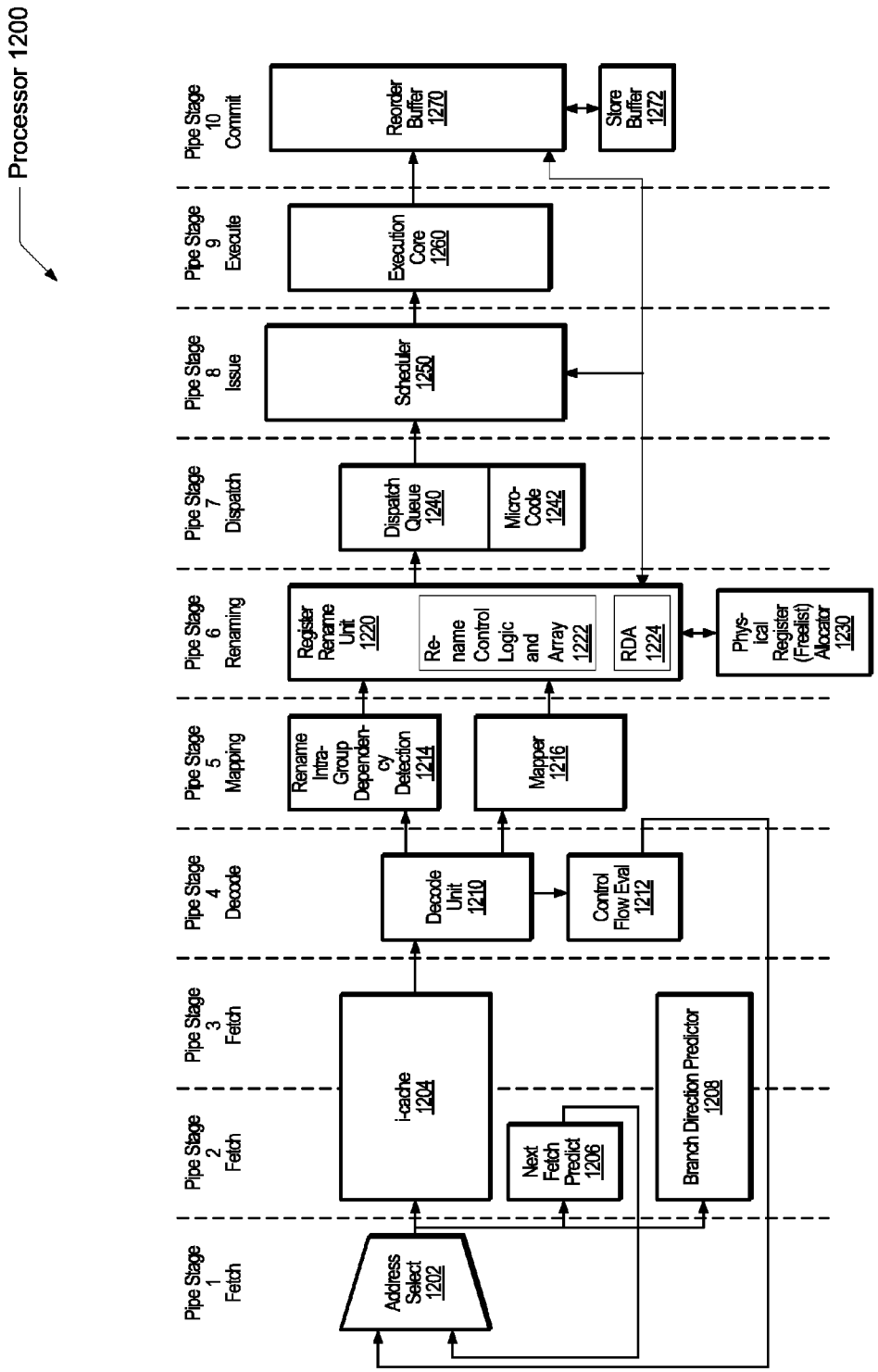
FIG. 12 is a generalized block diagram illustrating one embodiment of a processor core that performs superscalar, out-of-order execution with zero cycle move operations.

Referring now to FIG. 12, a generalized block diagram illustrating one embodiment of a processor core 1200 that performs superscalar, out-of-order execution with zero cycle move operations is shown. The processor core 1200 may utilize a multi-stage pipeline for processing of instructions. Although functional and control blocks are shown in a particular order and in a particular pipe stage, other combinations are possible and contemplated. In addition, the functional and control blocks may occupy more than one pipe stage. In most cases, a single pipe stage is shown for each functional block for ease of illustration.

An instruction-cache (i-cache) 1204 may store instructions for a software application. One or more instructions indicated by an address conveyed by address select logic 1202 may be fetched from the i-cache 1204. Multiple instructions may be fetched from the i-cache 1204 per clock cycle if there are no i-cache misses. The address may be incremented by a next fetch predictor 1206. A branch direction predictor 1208 may be coupled to each of the next fetch predictor 1206 and the control flow evaluation logic 1212 in a later pipeline stage. The predictor 1208 may predict information of instructions that change the flow of an instruction stream from executing a next sequential instruction.

The decode unit 1210 decodes the opcodes of the multiple fetched instructions. Alternatively, the instructions may be divided into micro-instructions, or micro-ops. As used herein, the terms "instructions" and "micro-ops" are interchangeable as the invention may be used with an architecture that utilizes either implementation. In one embodiment, the control flow evaluation block 1212 may alter fetch of instructions in the address selector 1202. For example, an absolute address value associated with an unconditional branch opcode may be sent to the address selector 1202.

Rename intra-group dependency detection logic 1214 may find dependencies among instructions decoded by the decode unit 1210. An intra-group of instructions may include decoded instructions from one or more clock cycles, or pipe stages. Dependencies such as write-after-read (WAR), write-after-write (WAW) and read-after-write (RAW) may be detected. Dependency vectors that indicate dependencies between instructions may be generated. The mapper 1216 may divide instructions among distributed hardware resources using factors such as available concurrency, criticality of dependence chains, and communication penalties.

The register rename unit 1220 may include rename control logic and array 1222 and register duplication array (RDA) 1224. The register rename unit 1220 may determine which physical register numbers to use to rename architectural register numbers used in both destination and source operands within instructions. The register rename unit may select candidate physical register numbers from the freelist allocator 1230 or a rename mapping table within the rename control logic 1222. The register rename unit may determine a given move instruction qualifies to be converted to a zero cycle move operation as described earlier. The register rename unit 1220 may assign the destination operand a same rename register number as used for the source operand. Additionally, the register rename unit 1220 may mark the move instruction in a manner to prevent it from proceeding for instruction execution. For example, the register rename unit 1220 may mark the move instruction as complete at dispatch.

After instructions have been decoded and renamed, associated entries may be allocated in the dispatch queue 1240. Instructions and associated renamed identifiers, program counter (PC) values, dependency vectors, markings for completion, and so forth may be sent to the dispatch queue 1240 and later to the scheduler 1250. Various exceptions may be detected, such as by the execution core 1260. Examples include protection exceptions for memory accesses, no address translation, and so forth. The exceptions may cause a corresponding exception handling routine to be executed, such as by the microcode 1242.

The scheduler 1250 may schedule instructions for execution in the execution core 1260. When operands are available and hardware resources are also available, an instruction may be issued out-of-order from the scheduler 1250 to one of the functional units within the execution core 1260. The scheduler 1250 may read its source operands from an architectural register file (not shown) after translating renamed identifiers with a mapping table or from operand bypass logic. The source operands may be provided to the execution core 1260.

The execution core 1260 may include a load/store unit. The load/store unit may be connected to a data cache (not shown) and the store buffer 1272 either directly or through the reorder buffer (rob) 1270. The processor 1200 may include a translation look-aside buffer (TLB) for each of the i-cache 1204 and the data cache to avoid a cost of performing a full memory translation when performing a cache access. The store buffer 1272 may store addresses corresponding to store instructions.

The rob 1270 may receive results from the execution core 1260. In addition, results may be bypassed to previous pipeline stages for data forwarding to dependent instructions already in the pipeline. The rob 1270 may ensure in-order commit and retirement of instructions. When a move instruction is a candidate for commit, the rob 1270 may send an indication to the register rename unit 1220. The register rename unit 1220 may determine whether an associated renamed register number is duplicated and whether the renamed register number is to be returned to the free list 1230. A duplicate count for duplicated renamed register numbers may be maintained within the rename register unit 1220. Incrementing and decrementing of the duplicate count may occur as described in earlier examples.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
an architectural register file comprising a plurality of registers;
a decoder configured to decode fetched instructions;
a register duplication array (RDA) comprising a plurality of entries, wherein said plurality of entries is fewer than said plurality of registers, and wherein each entry is configured to store:
an identification of a given rename register identifier (ID); and
a count of mappings to the given rename register ID; and
a register rename unit configured to:
maintain the stored counts of mappings for no more than the plurality of entries of the RDA;
receive instructions; and in response to determining a given instruction qualifies for a zero cycle move operation:
assign a rename register ID of a source operand of the given instruction to a destination operand of the given instruction;
access the RDA with the rename register ID of the source operand of the given instruction;
in response to detecting the RDA does not include an entry corresponding to the rename register ID:
allocate a given entry of the RDA for the rename register ID;
store an identification of the rename register ID in the given entry; and
store a count of a number of mappings to the rename register ID in the given entry;
in response to detecting the RDA includes a previously allocated entry corresponding to the rename register ID, increment a count of a number of mappings to the rename register ID in the previously allocated entry;
prevent the given instruction from proceeding in a pipeline of the processor;
wherein in response to accessing the RDA for a first instruction of the received instructions, determining the RDA has no allocated entry for the first instruction and the RDA is full, the register rename unit is further configured to access a free list to assign a rename register ID to a destination operand of the first instruction with no storage of a count of a number of mappings to the rename register ID.

2. The processor as recited in claim 1, wherein determining a given instruction qualifies for a zero cycle move operation comprises determining the given instruction is a register to register move operation.

3. The processor as recited in claim 1, wherein to prevent the given instruction from proceeding in the pipeline, the register rename unit is configured to indicate the given instruction has been completed.

4. The processor as recited in claim 1, wherein the register rename unit is further configured to:
detect the given instruction is ready to commit; and
prevent the given rename register identifier from returning to a free list in response to determining the given rename register identifier is duplicated.

5. The processor as recited in claim 1, wherein the register rename unit is further configured to increment a count in a given entry in the RDA each time an architectural register number currently not mapped to a rename register identifier is mapped to the rename register identifier.

6. The processor as recited in claim 1, wherein the processor further comprises a mapping table for storing mappings between architectural register numbers and rename register IDs, and wherein the mapping table and the RDA are separate data structures.

7. The processor as recited in claim 1, wherein in response to detecting a count reaches zero in a given entry in the RDA, the register rename unit is further configured to deallocate the given entry.

8. A method comprising:
decoding fetched instructions;
storing in a register duplication array (RDA) comprising a plurality of entries, wherein said plurality of entries is fewer than a plurality of registers in an architectural register file:
an identification of a given rename register identifier (ID); and
a count of mappings to the given rename register ID; and
maintaining the stored counts of mappings for no more than the plurality of entries of the RDA;
in response to determining a given instruction qualifies for a zero cycle move operation:
assigning a rename register identifier (ID) of a source operand of the given instruction to a destination operand of the given instruction;
accessing the RDA with the rename register ID of the source operand of the given instruction;
in response to detecting the RDA does not include an entry corresponding to the rename register ID:
allocating a given entry of the RDA for the rename register ID; and
storing an identification of the rename register ID in the given entry; and
storing a count of a number of mappings to the rename register ID in the given entry;
in response to detecting the RDA includes a previously allocated entry corresponding to the rename register ID, incrementing a count of a number of mappings to the rename register ID in the previously allocated entry;
preventing the given instruction from proceeding in a pipeline of the processor;
in response to accessing the RDA for a first instruction of the received instructions, determining the RDA has no allocated entry for the first instruction and the RDA is full, accessing a free list to assign a rename register ID to a destination operand of the first instruction with no storage of a count of a number of mappings to the rename register ID.

9. The method as recited in claim 8, wherein determining a given instruction qualifies for a zero cycle move operation comprises determining the given instruction is a register to register move operation.

10. The method as recited in claim 8, further comprising:
detecting the given instruction is ready to commit; and
preventing the given rename register identifier from returning to the free list in response to determining the given rename register identifier is duplicated.

11. The method as recited in claim 10, further comprising allowing the given rename register identifier to return to a free list in response to detecting the given instruction is ready to commit and the given rename register identifier is not duplicated.

12. The method as recited in claim 8, further comprising incrementing a count in a given entry in the RDA each time any AR number of the plurality of AR numbers currently not mapped to a rename register identifier corresponding to the given entry is mapped to the rename register identifier.

13. The method as recited in claim 8, wherein in response to determining an instruction commits, the method further comprises:
accessing the RDA for the instruction with a register rename identifier (ID) of each operand of the instruction;
in response to detecting a miss in the RDA for an operand of the instruction, returning a register rename ID of the operand to the free list; and
in response to detecting a hit in the RDA for an operand of the instruction, decrementing a count in an entry in the RDA corresponding to a register rename ID of the operand.

14. The method as recited in claim 8, wherein in response to detecting a count reaches zero in a given entry in the RDA, the method further comprises deallocating the given entry.

15. The method as recited in claim 8, wherein responsive to accessing the RDA for the given instruction, the method further comprises determining a miss occurs in response to detecting a count reaches a particular value for an entry corresponding to the source operand of the given instruction.

16. A register rename unit comprising:
    a first interface configured to receive decoded instructions;
    a second interface to a dispatch unit configured to dispatch instructions to a scheduler; and
    zero cycle move logic configured to:
        store in a register duplication array (RDA) comprising a plurality of entries which is fewer than a plurality of registers of an architectural register file:
            an identification of a given rename register identifier (ID); and
            a count of mappings to the given rename register ID; and
        maintain the stored counts of mappings for no more than the plurality of entries of the RDA;
        in response to determining a given instruction qualifies for a zero cycle move operation:
            assign a rename register identifier (ID) of a source operand of the given instruction to a destination operand of the given instruction;
            access the RDA with the rename register ID of a source operand of the given instruction;
            in response to detecting the RDA does not include an entry corresponding to the rename register ID:
                allocate a given entry of the RDA for the rename register ID;
                store an identification of the rename register ID in the given entry; and
                store a count of a number of mappings to the rename register ID in the given entry;
            in response to detecting the RDA includes a previously allocated entry corresponding to the rename register ID, increment a count of a number of mappings to the rename register ID in the previously allocated entry;
            prevent the given instruction from proceeding in a pipeline of the processor;
        in response to accessing the RDA for a first instruction of the received instructions, determining the RDA has no allocated entry for the first instruction and the RDA is full, circuitry configured to access a free list to assign a rename register ID to a destination operand of the first instruction with no storage of a count of a number of mappings to the rename register ID.

17. The register rename unit as recited in claim 16, wherein determining a given instruction qualifies for a zero cycle move operation comprises determining the given instruction is a register to register move operation.

18. The register rename unit as recited in claim 16, wherein the zero cycle move logic is further configured to:
    detect the given instruction is ready to commit; and
    prevent the given rename register identifier from returning to a free list in response to determining the given rename register identifier is duplicated.

19. The register rename unit as recited in claim 18, wherein the zero cycle move logic is further configured to increment a count in a given entry in the RDA each time any AR number of the plurality of AR numbers currently not mapped to a rename register identifier corresponding to the given entry is mapped to the rename register identifier.

20. The register rename unit as recited in claim 19, wherein in response to determining an instruction commits, the zero cycle move logic is further configured to:
    access the RDA for the instruction with a register rename identifier (ID) of each operand of the instruction;
    in response to detecting a miss in the RDA for an operand of the instruction, return a register rename ID of the operand to the free list; and
    in response to detecting a hit in the RDA for an operand of the instruction, decrement a count in an entry in the RDA corresponding to a register rename ID of the operand.

21. The register rename unit as recited in claim 16, wherein in response to detecting a count reaches zero in a given entry in the RDA, the zero cycle move logic is further configured to deallocate the given entry.

22. An apparatus comprising:
    control logic; and
    a register duplication array (RDA) comprising a plurality of entries, wherein said plurality of entries is fewer than said plurality of registers, and wherein each entry is configured to store:
        an identification of a given rename register identifier (ID; and
        a count of mappings to the given rename register ID; and
    wherein the control logic is configured to:
        store in a register duplication array (RDA) comprising a plurality of entries:
            an identification of a given rename register identifier (ID); and
            a count of mappings to the given rename register ID; and
        maintain the stored counts of mappings for no more than the plurality of entries of the RDA;
        in response to determining a given instruction qualifies for a zero cycle move operation:
            assign a rename register identifier (ID) of a source operand of the given instruction to a destination operand of the given instruction;
            access the RDA with the rename register ID of the source operand of the given instruction;
            in response to detecting the RDA does not include an entry corresponding to the rename register ID:
                allocate a given entry of the RDA for the rename register ID;
                store an identification of the rename register ID in the given entry; and
                store a count of a number of mappings to the rename register ID in the given entry;
            in response to detecting the RDA includes a previously allocated entry corresponding to the rename register ID, increment a count of a number of mappings to the rename register ID in the previously allocated entry;
            mark the given instruction to prevent it from proceeding in the pipeline of the processor;
        wherein in response to accessing the RDA for a first instruction of the received instructions, determining the RDA has no allocated entry for the first instruction and the RDA is full, the control logic is further configured to access a free list to assign a rename register ID to a destination operand of the first instruction with no storage of a count of a number of mappings to the rename register ID.

23. The apparatus as recited in claim 22, wherein determining a given instruction qualifies for a zero cycle move operation comprises determining the given instruction is a register to register move operation.

* * * * *